(12) United States Patent
Goradia et al.

(10) Patent No.: US 12,210,654 B2
(45) Date of Patent: *Jan. 28, 2025

(54) USER INTERFACE (UI) FOR A REMOTE BROWSER ISOLATION (RBI) PROTECTED BROWSER

(71) Applicant: Versa Networks, Inc., Santa Clara, CA (US)

(72) Inventors: Harnish Narendra Goradia, Milpitas, CA (US); Stephen Gerard Frost, London (GB)

(73) Assignee: Versa Networks, Inc., San Jose, CA (US)

(*) Notice: Subject to any disclaimer, the term of this patent is extended or adjusted under 35 U.S.C. 154(b) by 369 days.

This patent is subject to a terminal disclaimer.

(21) Appl. No.: 17/859,964

(22) Filed: Jul. 7, 2022

(65) Prior Publication Data

US 2024/0012941 A1 Jan. 11, 2024

(51) Int. Cl.
*G06F 3/048* (2013.01)
*G06F 21/62* (2013.01)

(52) U.S. Cl.
CPC .... *G06F 21/6281* (2013.01); *G06F 2221/032* (2013.01)

(58) Field of Classification Search
CPC ...... G06F 21/53; G06F 21/51; G06F 21/6218; G06F 2221/2149
See application file for complete search history.

(56) References Cited

U.S. PATENT DOCUMENTS

| | | | |
|---|---|---|---|
| 8,904,538 B1* | 12/2014 | Glick | G06F 21/554 726/24 |
| 11,544,344 B2* | 1/2023 | Chu | G06F 16/972 |
| 11,799,970 B1* | 10/2023 | Kandaswamy | H04L 67/141 |
| 11,915,019 B2* | 2/2024 | Goradia | G06F 3/0482 |
| 2005/0086666 A1* | 4/2005 | Nason | G06F 21/82 719/321 |
| 2005/0240983 A1* | 10/2005 | Peters | G06F 9/451 726/1 |
| 2006/0001660 A1* | 1/2006 | Plut | G06F 1/3218 345/211 |

(Continued)

FOREIGN PATENT DOCUMENTS

| | | | | |
|---|---|---|---|---|
| WO | WO-2008104025 A1 * | 9/2008 | | B42D 25/342 |
| WO | WO-2022051080 A1 * | 3/2022 | | G06F 21/16 |
| WO | WO-2023137046 A1 * | 7/2023 | | G06F 16/9554 |

OTHER PUBLICATIONS

Netskope, "Netskope Remote Browser Isolation", Data Sheet, (Aug. 21, 2021), 2 pgs.

*Primary Examiner* — Rashawn N Tillery
(74) *Attorney, Agent, or Firm* — LOZA & LOZA, LLP

(57) ABSTRACT

Embodiments of non-transitory computer readable mediums for displaying a remote browser isolation (RBI) protected browser are disclosed. In an embodiment, a non-transitory computer readable medium includes instructions to be executed in a computer system, where the instructions when executed in the computer system perform a method including displaying an RBI protected browser, displaying a border at least partially around the RBI protected browser, and displaying a security feature within the border, where the border and the security feature indicate to a user that the RBI protected browser is RBI protected.

19 Claims, 20 Drawing Sheets

(56) References Cited

U.S. PATENT DOCUMENTS

| | | | |
|---|---|---|---|
| 2006/0259873 A1* | 11/2006 | Mister | G06F 21/83 |
| | | | 715/781 |
| 2007/0255953 A1* | 11/2007 | Peyret | H04L 63/1483 |
| | | | 713/168 |
| 2010/0064232 A1* | 3/2010 | Brandwine | G06F 21/6209 |
| | | | 715/760 |
| 2010/0275024 A1* | 10/2010 | Abdulhayoglu | H04L 9/321 |
| | | | 713/175 |
| 2011/0047467 A1 | 2/2011 | Porter | |
| 2016/0253772 A1* | 9/2016 | Kofod | G06T 1/0021 |
| | | | 382/100 |
| 2016/0378685 A1* | 12/2016 | Spurlock | G06F 12/145 |
| | | | 711/163 |
| 2019/0303354 A1* | 10/2019 | Zamir | G06F 16/113 |
| 2021/0194871 A1* | 6/2021 | Batchu | H04L 63/102 |
| 2021/0250333 A1* | 8/2021 | Negrea | H04L 67/10 |
| 2022/0100902 A1 | 3/2022 | Juniper et al. | |
| 2022/0109700 A1* | 4/2022 | Guruswamy | H04L 63/20 |
| 2022/0188438 A1* | 6/2022 | Lewin | H04L 63/20 |
| 2022/0245263 A1* | 8/2022 | Pasternak | G06F 21/32 |
| 2022/0262358 A1* | 8/2022 | Meriaz | G06F 3/0483 |
| 2022/0345663 A1* | 10/2022 | Pasternak | H04L 67/10 |
| 2022/0360607 A1* | 11/2022 | Amiga | H04L 63/20 |

* cited by examiner

USER INTERFACE (UI) FOR A REMOTE BROWSER ISOLATION (RBI) PROTECTED BROWSER

BACKGROUND

When browsing the World Wide Web (WWW), client devices, e.g., personal computers (PCs), may execute various browsing operations, such as loading webpages, downloading data, uploading content, etc. Remote browser isolation (RBI) may be implemented via a client device to limit exposure to harmful webpage code, malware infections, cyber-attacks, and the like. However, a user may not even be aware that the browsing is protected by RBI.

SUMMARY

Embodiments of non-transitory computer readable mediums for displaying a remote browser isolation (RBI) protected browser are disclosed. In an embodiment, a non-transitory computer readable medium includes instructions to be executed in a computer system, where the instructions when executed in the computer system perform a method including displaying an RBI protected browser, displaying a border at least partially around the RBI protected browser, and displaying a security feature within the border, where the border and the security feature indicate to a user that the RBI protected browser is RBI protected.

In an embodiment, the security feature is displayed using a repeating pattern along the border.

In an embodiment, the security feature is an icon, and where the icon is repeated in the repeating pattern along the border.

In an embodiment, the security feature is security text, and where the security text is repeated in the repeating pattern along the border.

In an embodiment, the security text is at least one of remote browser protection, read only, preview downloads, allow downloads, block uploads, and full interaction.

In an embodiment, the security feature indicates RBI protected browsing.

In an embodiment, the border is directly adjacent to at least one edge of the RBI protected browser.

In an embodiment, the border is displayed at least partially around an address bar of the RBI protected browser.

In an embodiment, the border is displayed at least partially around a title bar of the RBI protected browser.

In an embodiment, the border is displayed at least partially around an edge of a display window of the RBI protected browser.

In an embodiment, the border includes an outer border and an inner border, and where the inner border is directly adjacent to the outer border along at least one edge.

In an embodiment, the inner border is directly adjacent to an outer edge of the RBI protected browser, and the inner border and the outer edge of the RBI protected browser are colinear.

In an embodiment, the outer border is displayed at least partially around an edge of the RBI protected browser, and the inner border is displayed at least partially around an edge of a display window of the RBI protected browser.

In an embodiment, the outer border is a colored border, and the inner border is indicated by the security feature, where the security feature is displayed using a repeating pattern along the inner border.

In an embodiment, the outer border is indicated by the security feature, where the security feature is displayed using a repeating pattern along the outer border, and the inner border is a colored border.

In an embodiment, the security feature includes a first security feature and a second security feature, and where the first security feature changes to the second security feature when an RBI protected browsing action is triggered.

In an embodiment, the border is a colored border, and where the security feature is at least one of security text, an icon, and branding.

In an embodiment, the colored border is green, the security text indicates at least one of a security profile and a security policy that a user is subject to during RBI protected browsing, the icon is a shield, the branding is a company logo.

Another non-transitory computer readable medium is also disclosed. In an embodiment, the non-transitory computer readable medium includes instructions to be executed in a computer system, where the instructions when executed in the computer system perform a method including displaying an RBI protected browser, displaying a border around the RBI protected browser, and displaying a security feature within the border, where the border and the security feature indicate to a user that the RBI protected browser is RBI protected.

Another non-transitory computer readable medium is also disclosed. In an embodiment, the non-transitory computer readable medium includes instructions to be executed in a computer system, where the instructions when executed in the computer system perform a method including displaying an RBI protected browser, displaying a watermark at least partially around the RBI protected browser, and displaying a security feature within the watermark, where the watermark and the security feature indicate to a user that the RBI protected browser is RBI protected.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
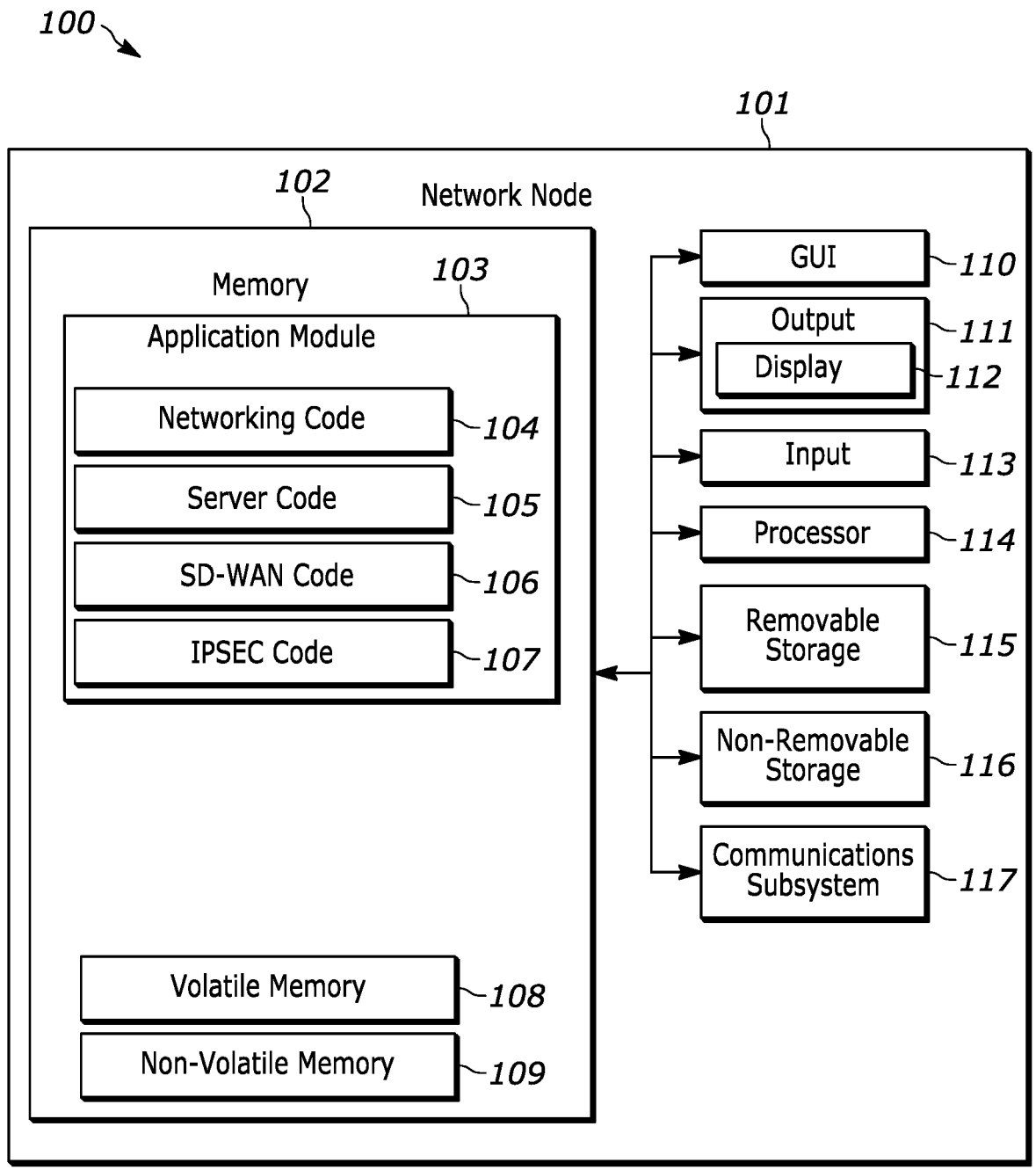
FIG. 1 is a high-level block diagram of a network node.

FIG. 1 is a high-level block diagram 100 of a network node 101. A computing device in the form of a computer configured to interface with controllers, peripheral devices, and other elements disclosed herein may include one or more processors 114, memory 102, removable storage 115, and non-removable storage 116. The memory 102 may include volatile memory 108 and/or non-volatile memory 109. The network node 101 may include or have access to a computing environment that includes a variety of transitory and non-transitory computer-readable media such as the volatile memory 108, the non-volatile memory 109, the removable storage 115 and the non-removable storage 116. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD-ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

The network node 101 may include, or have access to, a computing environment that includes an input device 113, an output device 111, and a communications subsystem 117. The network node 101 may operate in a networked environment using the communications subsystem 117 to connect to one or more remote computers, remote sensors and/or controllers, detection devices, hand-held devices, multi-function devices (MFDs), speakers, mobile devices, tablet devices, mobile phones, Smartphone, or other such devices. The remote computer may also be a personal computer (PC), server, router, network PC, radio frequency identification (RFID) enabled device, a peer device, other common network node, or the like. The communication connection may include a local area network (LAN), a wide area network (WAN), Bluetooth connection, or other networks.

The output device 111 is most commonly provided as a computer monitor, but may include any output device. The output device 111 and/or the input device 113 may include a data collection apparatus associated with the network node 101. In addition, the input device 113, which commonly includes a computer keyboard and/or pointing device such as a computer mouse, computer track pad, touch screen, or the like, allows a user to select and instruct the network node 101. A user interface can be provided using the output device 111 and the input device 113. The output device 111 may include a display 112 for displaying data and information for a user, or for interactively displaying a graphical user interface (GUI) 110. A GUI is typically responsive of user inputs entered through the input device 113 and typically displays images and data on the display 112.

As described herein, "GUI" generally refers to a type of environment that represents programs, files, options, and so forth by means of graphically displayed icons, menus, and dialog boxes on a computer monitor screen or smart phone screen. A user can interact with the GUI to select and activate such options by directly touching the screen and/or pointing and clicking with the input device 113 such as, for example, a pointing device such as a mouse, and/or with a keyboard. A particular item can function in the same manner to the user in all applications because the GUI provides standard software routines (e.g., the application module 103 can include program code in executable instructions, including such software routines) to handle these elements and report the user's actions.

Computer-readable instructions, for example, program code in the application module 103, can include or be representative of software routines, software subroutines, software objects, etc. described herein, are stored on a computer-readable medium and are executable by the processor device (also called a processing unit) 114 of the network node 101. The application module 103 can include computer code such as networking code 104, server code 105, software defined wide area network (SD-WAN) code 106, and Internet Protocol Security (IPSEC) code 107. A hard drive, CD-ROM, RAM, Flash Memory, and a Universal Serial Bus (USB) drive are just some examples of articles including a computer-readable medium.

Figure 2:
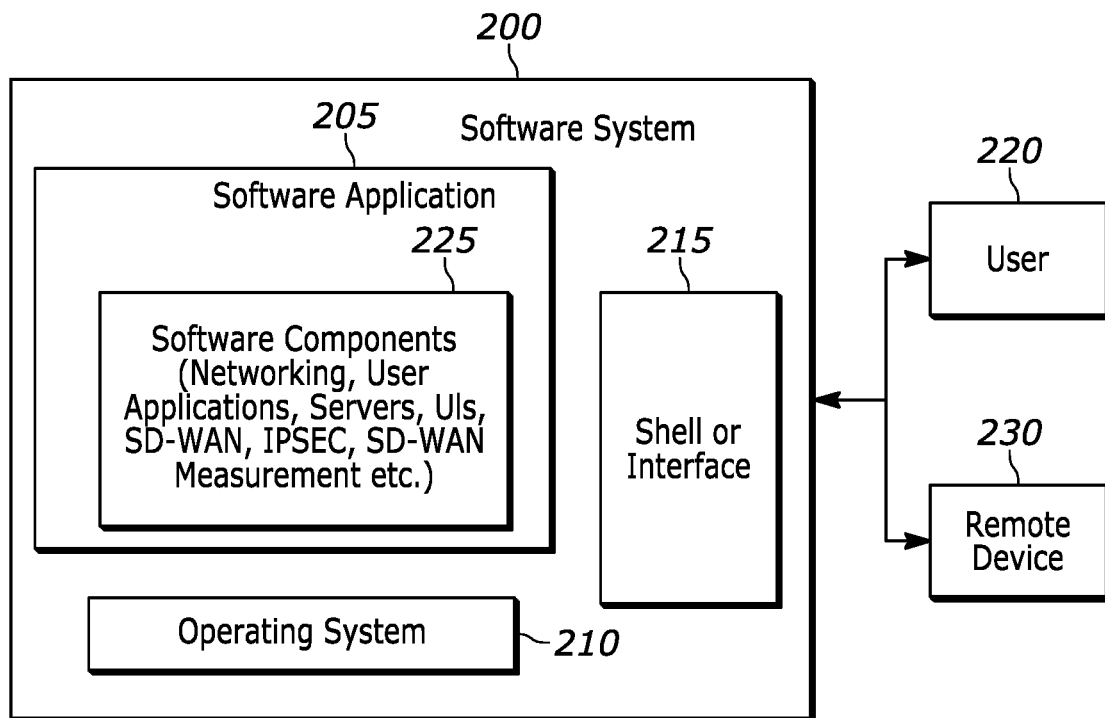
FIG. 2 is a high-level block diagram of a software system.

FIG. 2 is a high-level block diagram of a software system 200. FIG. 2 illustrates a software system 200, which may be employed for directing the operation of the data-processing systems such as the network node 101. Software applications may be stored in the memory 102, on the removable storage 115, or on the non-removable storage 116, and generally include and/or are associated with a kernel or operating system 210 and a shell or interface 215. One or more application programs may be "loaded" (i.e., transferred from the removable storage 115 or the non-removable storage 116 into the memory 102) for execution by the network node 101. A software application 205 can include software components 225 such as software modules, software subroutines, software objects, network code, user application code, server code, user interface (UI) code, SD-WAN code, IPSEC code, SD-WAN measurement code, etc. The software system 200 can have multiple software applications each containing software components. The network node 101 can receive user commands and data through the interface 215, which can include the input device 113, the output device 111, and the communications subsystem 117 accessible by a user 220 or a remote device 230. These inputs may then be acted upon by the network node 101 in accordance with instructions from the operating system 210 and/or the software application 205 and any software components 225 thereof.

Generally, the software components 225 can include, but are not limited to, routines, subroutines, software applications, programs, objects, modules, objects (used in object-oriented programs), executable instructions, data structures, etc., that perform particular tasks or implement particular abstract data types and instructions. Moreover, those skilled in the art will appreciate that elements of the disclosed methods and systems may be practiced with other computer system configurations such as, for example, hand-held devices, mobile phones, smartphones, tablet devices, multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the terms "component" and "module" as utilized herein may refer to one of or a collection of routines and data structures that perform a particular task or implements a particular abstract data type. Applications and components may be composed of two parts: an interface, which lists the constants, data types, variables, and routines that can be accessed by other modules or routines; and an implementation, which is typically private (accessible only from within the application or component) and which includes source code that actually implements the routines in the application or component. The terms "application" or "component" may also simply refer to an application such as a computer program designed to assist in the performance of a specific task such as word processing, accounting, inventory management. Components can be built or realized as special purpose hardware components designed to equivalently assist in the performance of a task.

The interface 215 can include a graphical user interface 110 that can display results, whereupon a user 220 or remote device 230 may supply additional inputs or terminate a particular session. In some embodiments, the operating system 210 and the GUI 110 can be implemented in the context of a "windows" system. It can be appreciated, of course, that other types of systems are possible. For example, rather than a traditional "windows" system, other operation systems such as, for example, a real-time operating system (RTOS) more commonly employed in wireless systems may also be employed with respect to the operating system 210 and the interface 215. The software application 205 can include, for example, the software components 225, which can include instructions for carrying out steps or logical operations such as those shown and described herein.

The description herein is presented with respect to embodiments that can be embodied in the context of, or require the use of, a data-processing system such as the network node 101, in conjunction with program code in the application module 103, in the memory 102, the software system 200, or the network node 101. The disclosed embodiments, however, are not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, Arduino, and the like. Therefore, the descriptions of the exemplary embodiments, which follow, are for purposes of illustration and not considered a limitation.

Network nodes 101 and software systems 200 can take the form of or run as virtual machines (VMs) or containers that run on physical machines. As discussed here, a VM can be different from a smart contract VM, and the two terms should not be used interchangeably. A VM or container typically supplies an operating environment, appearing to be an operating system, to program code in an application module and software applications 205 running in the VM or container. A single physical computer can run a collection of VMs and containers. In fact, an entire network data processing system including multitude of network nodes 101, LANs and perhaps even WANs or portions thereof can all be virtualized and running within a single computer (or a few computers) running VMs or containers. Those practiced in cloud computing are practiced in the use of VMs, containers, virtualized networks, and related technologies.

In some embodiments, when a user of a client device (e.g., network node 101) is browsing the World Wide Web (WWW), loading webpages, displaying webpages, downloading data, uploading data, etc. using applications which involve a browser loading content from remote and/or unsecure sources, the client device (and/or internal networks used by the client device) is subject to consequences such as harmful webpage code, malware infections, cyber-attacks, and the like. To protect the client device from experiencing such consequences, remote browser isolation (RBI) (sometimes referred to as "web isolation" or "browser isolation") may be implemented to help the user avoid potentially risky activity.

As described herein, "RBI" may be defined as a technology that separates browsing activity from a client device by hosting and running a browsing application at a secure location (e.g., a designated server, a remote server, a remote cloud, a remote cloud-based container, etc.), such that the secure location renders and pushes the browsing application or a Uniform Resource Locator (URL) to the client device. Secure remote browsing is enabled by a security operations administrator, or an information technology (IT) administrator created configuration of a predefined user policy or a custom defined user policy (e.g., block uploads, preview downloads, read only, etc.) for an application, a URL, and/or a user. The secure location may be an RBI server that is connected to the client device and/or to the internet, and that protects the browsing, the client device, and/or the internal network(s) from cyber threats. As described herein, browsing that is protected by RBI may be referred to as "RBI protected browsing", and may be displayed via a GUI of the client device. In an embodiment, the GUI of the client device may display the RBI protected browsing via a browser (e.g., GOOGLE CHROME, SAFARI, FIREFOX, INTERNET EXPLORER, etc.) that a user can use to access the WWW and that allows the user to search and view information via the internet. As described herein, a browser that displays RBI protected browsing may be referred to as an "RBI protected browser". In some embodiments, the RBI protected browser may include a combination of websites or webpages that are protected by RBI protected browsing and that are not protected by the RBI protected browsing.

It is important for a user to be cognizant of the RBI protected browsing because the RBI protected browsing may involve certain limitations and/or restrictions that protect the user from being subject to cyber threats. However, conventional RBI protected browsers may not clearly indicate (to a user) that RBI protected browsing or restrictions associated with the RBI protected browsing are being triggered at a client device. Consequently, the user may be unaware of whether or not a current browsing session is protected by RBI protected browsing, which may expose the client device to harmful browsing activity.

In accordance with an embodiment of the invention, a non-transitory computer readable medium that includes instructions to be executed in a computer system, where the instructions when executed in the computer system perform a method that includes displaying an RBI protected browser, displaying a border at least partially around the RBI protected browser, and displaying a security feature within the border, where the border and the security feature indicate to a user that the RBI protected browser is RBI protected. In an embodiment, the border is a colored border, and the security feature is security text, an icon, and/or a branding that is indicative of the security feature. In some embodiments, the security feature is displayed using a repeating pattern along the border.

By displaying an RBI protected browser with a border at least partially around the RBI protected browser and a security feature within the border, a user is readily aware of the status of RBI protected browsing. As such, a client device that displays an RBI protected browser with a border and a security feature within the border keeps the user informed of the RBI status in an unobstructive but easily recognizable manner. The displayed border and security feature do not interfere with browsing content of the RBI protected browser and do not require the user to check RBI status in a tool bar (e.g., a dropdown menu). In addition, the displayed border and security feature enable real-time notification of the RBI status to a user in a manner that is unobstructive to the content that is of primary interest to the user. Therefore, the RBI status may be known to the user with minimal eye movement and no cursor navigation by the user, all of which can greatly improve the user experience.

As described herein, a "border" may be a band or a strip that is located at or near an edge of one or more components of an RBI protected browser. Examples of the components of the RBI protected browser include, but are not limited to, a display window, an address bar, and a title bar. In some embodiments, the border may be partially around the RBI protected browser and/or the components of the RBI protected browser, such that a border that is partially around the RBI protected browser and/or its components may be referred to as a "partial border". As described herein, "partially around" implies that the border may be along (e.g., adjacent to, colinear with, in parallel with, etc.) one or more edges (e.g., one to four edges of a rectangular browser window) of the RBI protected browser and/or its components. In some embodiments, the border is a colored border, such that the colored border may display one or more colors (e.g., green, red, blue, yellow, orange, etc.).

As described herein, a "security feature" may be security text, an icon, and/or a branding that is displayed in or near the border. The security text may be a security-related word or phrase that may indicate a security profile or a security policy that a user is subject to during RBI protected browsing. As an example, the security profile or the security policy may be a predetermined set of restrictions that are applied during the RBI protected browsing (e.g., remote browser protection, read only, preview downloads, allow downloads, block uploads, full interaction, and the like). Examples of the icon include a shield, a lock, a checkmark, another security-related icon, or a combination thereof. Examples of the branding include a company logo, a company marker, or other company indicator. In some embodiments, the security feature is displayed in a repeating pattern along the border, such that the security feature is repeated along the border.

Figure 3:
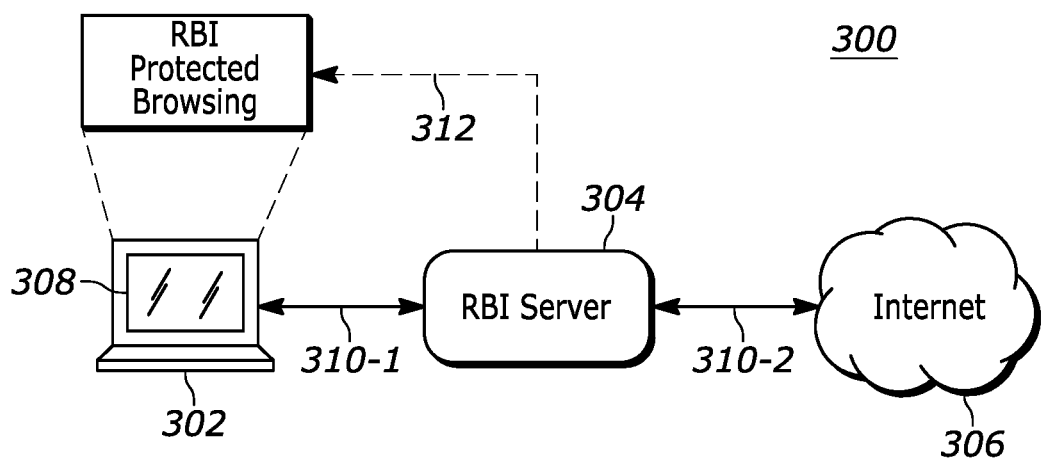
FIG. 3 depicts a high-level diagram of a remote browser isolation (RBI) protected system.

FIG. 3 depicts a high-level diagram of an RBI protected system 300. In an embodiment, the RBI protected system 300 includes a client device 302, an RBI server 304, and internet 306. The client device 302 may include the network node 101 and the software system 200, and may be a laptop, a mobile device, a desktop, or the like. In addition, the client device 302 includes a user interface (e.g., a keyboard and/or a mouse) and a display 308 for interactively displaying a GUI. The RBI server 304 enables RBI protected browsing at the client device 302 and may be a remote server, a remote cloud, a remote cloud-based container, or the like.

The client device 302 is connected to the RBI server 304 via a first connection 310-1, and the RBI server 304 is connected to the internet 306 via a second connection 310-2. The first connection 310-1 and/or the second connection 310-2 may be a wireless connection (e.g., wireless LAN, wireless WAN, Bluetooth, etc.), a wired connection (e.g., ethernet), or a combination thereof. Although not shown, the client device 302 may also be connected to the internet 306.

When the client device 302 initiates RBI protected browsing via the RBI server 304, the RBI server 304 pushes the RBI protected browsing to the client device 302 (shown by dashed arrow 312). Once the client device 302 receives the pushed RBI protected browsing from the RBI server 304, the client device 302 renders the RBI protected browsing and displays an RBI protected browser, a border at least partially around the RBI protected browser, and a security feature within the border via a GUI (shown by "RBI Protected Browsing").

Figure 4:
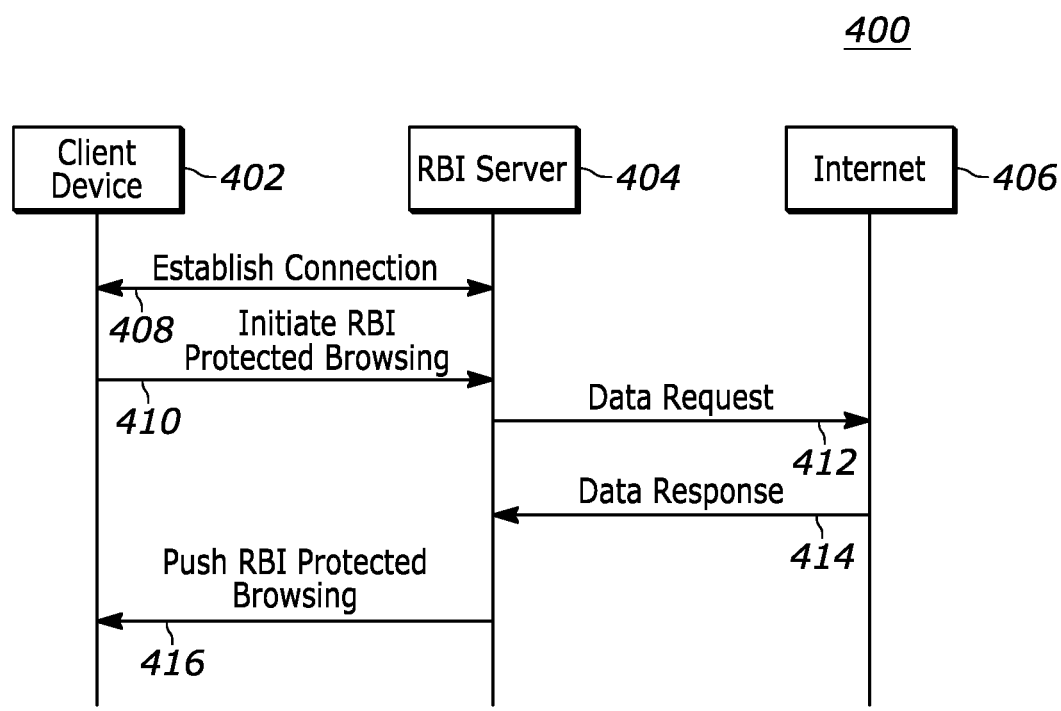
FIG. 4 depicts a high-level diagram of communications within an RBI protected system.

FIG. 4 depicts a high-level diagram of communications within an RBI protected system 400. In the embodiment of FIG. 4, the RBI protected system 400 includes a client device 402, an RBI server 404, and internet 406 as described with reference to FIG. 3. The client device 402, the RBI server 404, and/or the internet 406 communicate to establish connection, initiate RBI protected browsing, and display an RBI protected browser that corresponds to the RBI protected browsing. In an embodiment, the client device 402, the RBI server 404, and the internet 406 communicate using a wireless connection, a wired connection, or a combination thereof.

The client device 402 connects to the RBI server 404 to establish a connection at step 408. In an embodiment, the client device 402 connects to the RBI server 404 by transmitting a connection request that is accepted by the RBI server 404, or by automatically connecting when the client device and the RBI server are within range of each other.

The client device 402 then initiates RBI protected browsing via the RBI server 404 at step 410. In some embodiments, initiating the RBI protected browsing involves the client device 402 transmitting, to the RBI server 404, an instruction to provide computer readable code that includes instructions to display the RBI protected browsing via a GUI of the client device. In some embodiments, initiating the RBI protected browsing involves the client device 402 transmitting, to the RBI server 404, an instruction to provide computer readable code that includes instructions to indicate the RBI protected browsing by a partial border and a security feature.

The RBI server 404 then retrieves data that corresponds to the RBI protected browsing using the internet 406. In an embodiment, retrieving the data involves the RBI server 404 requesting the data from the internet 406 at step 412, and receiving a response that includes the requested data at step 414. In such an embodiment, the RBI server 404 loads and executes the data collected during the RBI protected browsing.

The RBI server 404 then pushes the RBI protected browsing to the client device 402 at step 416. In some embodiments, pushing the RBI protected browsing to the client device 402 involves the client device 402 receiving, from the RBI server 404, the computer readable code that includes instructions to display the RBI protected browsing via the GUI of the client device. In some embodiments, pushing the RBI protected browsing to the client device 402 involves the client device 402 receiving, from the RBI server 404, the computer readable code that includes instructions to indicate the RBI protected browsing by at least the partial border and the security feature. As an example, the computer readable code may be received via one or more packets transmitted by the RBI server 404.

Once the client device 402 receives the pushed RBI protected browsing from the RBI server 404, the client device 402 renders the RBI protected browsing and displays the RBI protected browsing via its GUI. In an embodiment, the RBI protected browsing is displayed by an RBI protected browser.

Examples of an RBI protected browser with a border and a security feature are described in further detail with reference to FIGS. 5-13.

Figure 5:
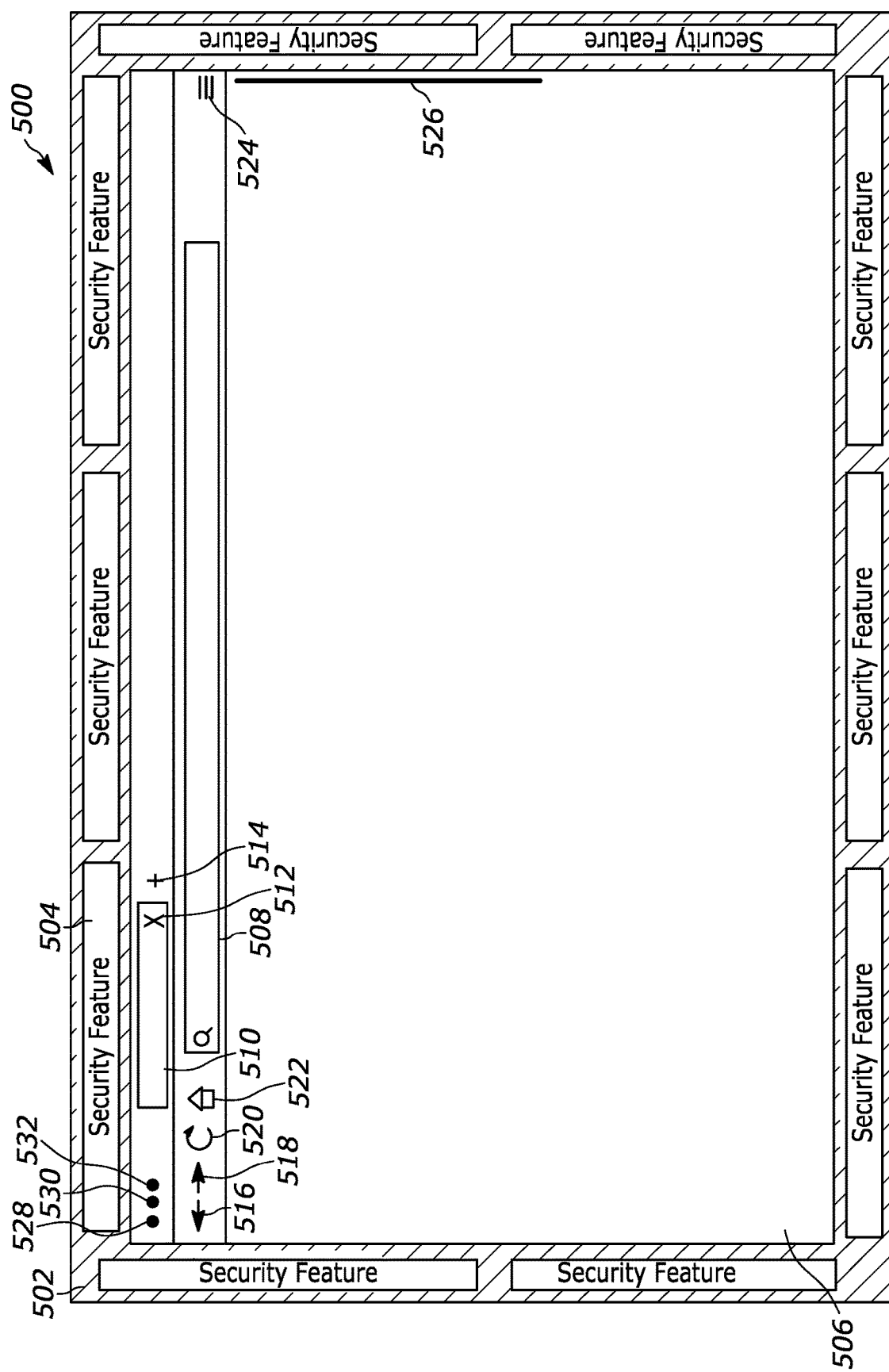
FIG. 5 depicts an example of an RBI protected browser, a border, and a security feature within the border.

FIG. 5 depicts an example of an RBI protected browser 500, a border 502, and a security feature 504 within the border 502. In the embodiment depicted in FIG. 5, the RBI protected browser 500 includes various functional parts that allow users to perform corresponding functional operations (e.g., access a hyperlink, navigate a web page, download data, etc.). For example, the RBI protected browser 500 includes a display window 506, an address bar 508, a title bar 510, a close tab button 512, a new tab button 514, a back button 516, a forward button 518, a refresh button 520, a homepage button 522, a menu button 524, a scroll bar 526, a close browser button 528, a minimize browser button 530, and a maximize browser button 532.

The display window 506 is an area where a website or a page (e.g., web page) can be viewed and navigated by a user to access hyperlinks, downloads, or different pages of a website. The address bar 508 displays a URL, or a website address of the page shown in the display window 506 and can be used to search and/or to navigate to different URLs or websites. The title bar 510 displays a title of the URL, or the website shown in the display window 506 and the address bar 508. The close tab button 512 can be used to close the current page from the RBI protected browser if more than one page is open, or to close the RBI protected browser if (only) one page is displayed. The new tab button 514 can be used to open a new page, where the new page can be subsequently displayed in the display window 506 and a title of the new page is shown in an additional title bar (not shown).

The back button 516 can be used to go back to a previous page viewed by the user and the forward button 518 can be used to go forward to a page viewed before the current page shown in the display window 506. The refresh button 520 can be used to refresh the page shown in the display window 506 and the address bar 508. The homepage button 522 can be used to navigate to a preset homepage (e.g., https://www.google.com/, https://www.yahoo.com/, https://www.bing.com/, etc.). The menu button 524 can be used to access settings, browser history, bookmarks, downloads, etc. and/or to zoom in or out on the page in the display window 506, to open new tabs or windows, to print, etc. The scroll bar 526 can be used to navigate up or down on the page shown in the display window 506. The close browser button 528, the minimize browser button 530, and the maximize browser button 532 can be used by the user to close the RBI protected browser 500, minimize the RBI protected browser 500, and maximize the RBI protected browser 500, respectively.

In an embodiment, the border 502 is displayed around outer edges of the RBI protected browser 500, such that the border 502 surrounds a perimeter of the RBI protected browser 500. In some embodiments, the border 502 includes an inner border (e.g., an inner edge of the border 502) that is directly adjacent to the outer edges of the RBI protected browser 500 and an outer border (e.g., an outer edge of the border 502) that surrounds the inner border. In such an embodiment, the inner border is colinear with the outer edges of the RBI protected browser 500. As an example, the border 502 has a thickness that is at least humanly visible (e.g., at least 1 pixel (px) extending outward from the RBI protected browser 500, and has squared corners or rounded corners (not shown). In some embodiments, the border 502 is displayed by a color (shown by diagonal lines), such that the color may be green, red, blue, yellow, orange, etc. In some embodiments, the border 502 may be displayed by a combination of two or more colors (e.g., black and yellow, green and white, green and black, etc.), such that the colors may be alternated in a repeating pattern within the border, or such that an inner portion (e.g., inner edge(s)) is colored, and an outer portion (e.g., outer edge(s)) is not colored. In some embodiments, the border 502 may be transparent, translucent, and/or opaque.

In an embodiment, the security feature 504 is displayed within the border 502. The security feature 504 may be displayed using a repeating pattern along the border 502, such that more than one security feature is displayed. For example, the security feature 504 is repeated around the outer edges of the RBI protected browser 500, such that the security feature 504 is duplicated and surrounds the perimeter of the RBI protected browser 500. In some embodiments, the security features may be separated by a distance that is at least humanly visible (e.g., at least 1 px) and may be separated from the inner border and the outer border of the border 502 by a distance that is at least humanly visible (e.g., at 1 px). In some embodiments, the security features may be transparent, translucent, and/or opaque. Although the border 502 is shown as including ten security features, the border 502 may also include less than ten or more than ten security features.

Figure 6:
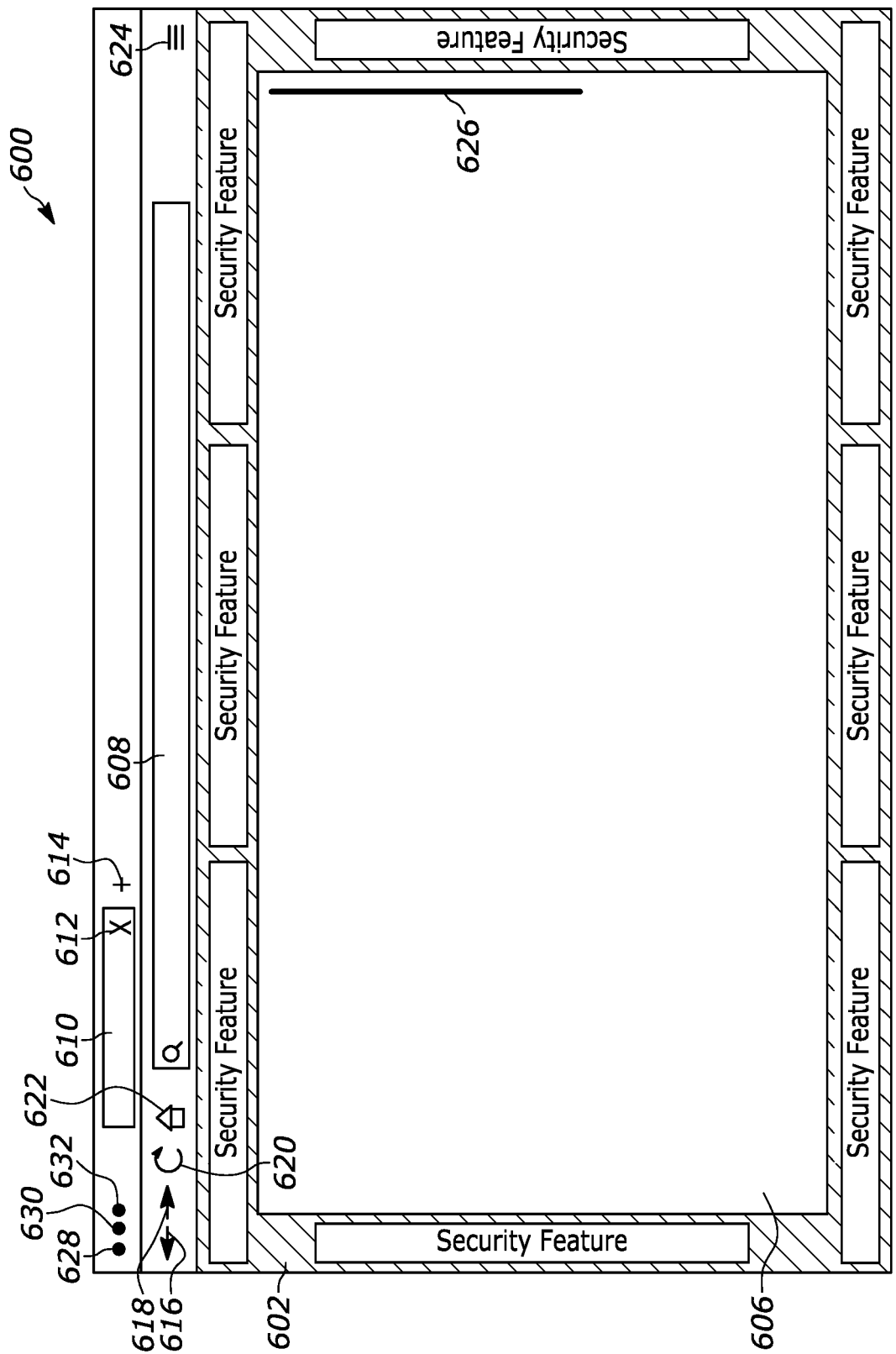
FIG. 6 depicts another example of an RBI protected browser, a border, and a security feature within the border.

FIG. 6 depicts another example of an RBI protected browser 600, a border 602, and a security feature 604 within the border 602. The RBI protected browser 600 includes the display window 606, the address bar 608, the title bar 610, the close tab button 612, the new tab button 614, the back button 616, the forward button 618, the refresh button 620, the homepage button 622, the menu button 624, the scroll bar 626, the close browser button 628, the minimize browser button 630, and the maximize browser button 632, the border 602 that includes the inner border and the outer border, and the security feature 604 that is repeated along the border 602 as described with reference to FIG. 5.

In contrast to FIG. 5, the border 602 shown in FIG. 6 is displayed around outer edges of the display window 606 of the RBI protected browser 600, such that the border 602 surrounds a perimeter of the display window 606. In some embodiments, the inner border (e.g., inner border edges) of the border 602 is directly adjacent to the outer edges of the display window 606 and the outer border (e.g., outer border edges) is directly adjacent to three outer edges (e.g., left edge, right edge, and bottom edge) of the RBI protected browser 600. In such an embodiment, the inner border is colinear with the outer edges of the display window 606 and the outer border is colinear with the three outer edges of the RBI protected browser 600.

Although not shown, in some embodiments, the border 602 may be an overlay or a watermark on the display window 606, such that the border 602 is transparent or translucent, and such that the display window 606 extends to the edges of the RBI protected browser (similar to the display window 506 shown in FIG. 5). Additionally, although the border 602 is shown as including eight security features, the border 602 may include less than eight or more than eight security features.

Figure 7:
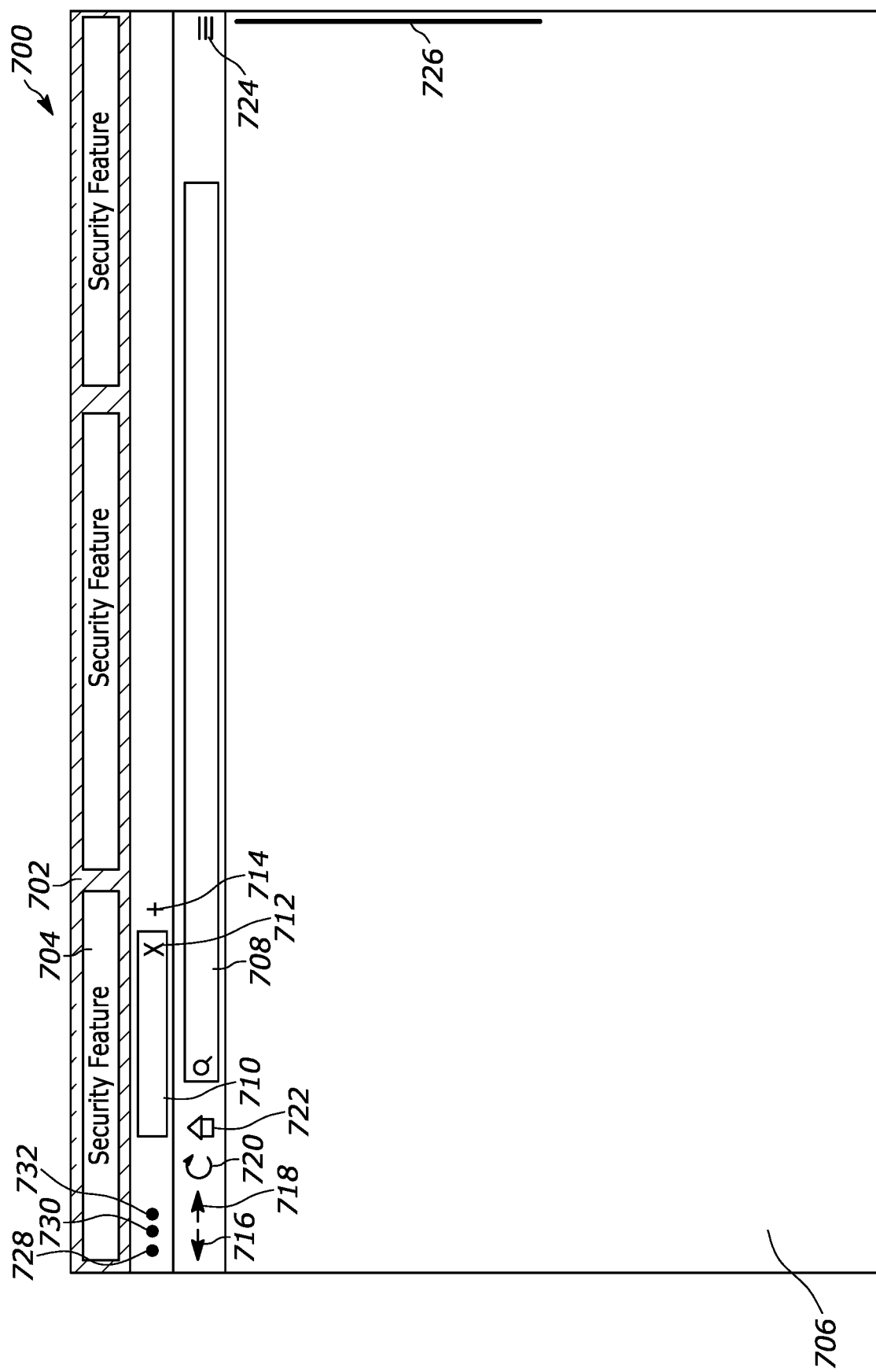
FIG. 7 depicts another example of an RBI protected browser, a border, and a security feature within the border.

FIG. 7 depicts another example of an RBI protected browser 700, a border 702, and a security feature 704 within the border 702. The RBI protected browser 700 includes the display window 706, the address bar 708, the title bar 710, the close tab button 712, the new tab button 714, the back button 716, the forward button 718, the refresh button 720, the homepage button 722, the menu button 724, the scroll bar 726, the close browser button 728, the minimize browser button 730, and the maximize browser button 732, the border 702 that includes the inner border and the outer border, and the security feature 704 that is repeated along the border 702 as described with reference to FIG. 5.

In contrast to FIG. 5, the border 702 shown in FIG. 7 is displayed partially around the RBI protected browser 700, such that the border 702 is a partial border displayed along a top edge of the RBI protected browser 700. In some embodiments, the inner border (e.g., bottom border edge) of the border 702 is directly adjacent to an outer edge (e.g., the top edge) of the RBI protected browser 700, such that the inner border is colinear with the outer edge of the RBI protected browser 700. Although the border 702 is shown along the top edge of the RBI protected browser 700, the border 702 may also be along the left edge of the RBI protected browser, the right edge of the RBI protected browser, the bottom edge of the RBI protected browser, or a combination thereof. Additionally, although the border 702 is shown as including three security features, the border 702 may include less than three or more than three security features.

Figure 8:
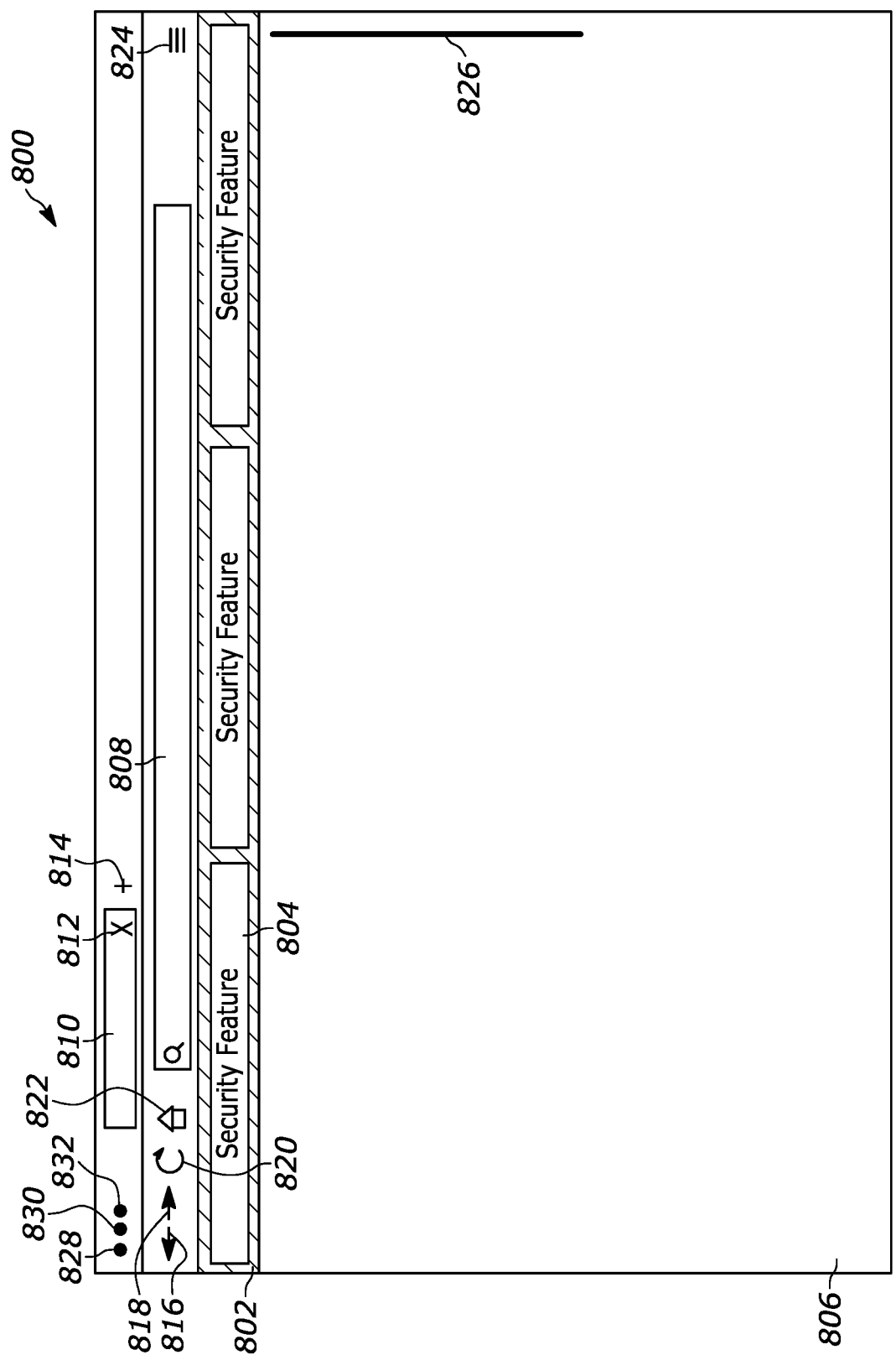
FIG. 8 depicts another example of an RBI protected browser, a border, and a security feature within the border.

FIG. 8 depicts another example of an RBI protected browser 800, a border 802, and a security feature 804 within the border 802. The RBI protected browser 800 includes the display window 806, the address bar 808, the title bar 810, the close tab button 812, the new tab button 814, the back button 816, the forward button 818, the refresh button 820, the homepage button 822, the menu button 824, the scroll bar 826, the close browser button 828, the minimize browser button 830, and the maximize browser button 832, the border 802 that includes the inner border and the outer border, and the security feature 804 that is repeated along the border 802 as described with reference to FIG. 7.

In contrast to FIG. 7, the border 802 shown in FIG. 8 is displayed partially around the display window 806 of the RBI protected browser 800, such that the border 802 is a partial border displayed along a top edge of the display window 806. In some embodiments, the inner border (e.g., bottom border edge) of the border 802 is directly adjacent to an outer edge (e.g., the top edge) of the display window 806, such that the inner border is colinear with the outer edge of the display window 806.

Although not shown, in some embodiments, the border 802 may be an overlay or a watermark on the display window 806, such that the border 802 is transparent or translucent, and such that the display window 806 extends to the edges of the RBI protected browser (similar to the display window 806 shown in FIG. 5). Additionally, although the border 802 is shown along the top edge of the display window 806, the border 802 may also be along the left edge of the display window, the right edge of the display window, the bottom edge of the display window, or a combination thereof.

Figure 9:
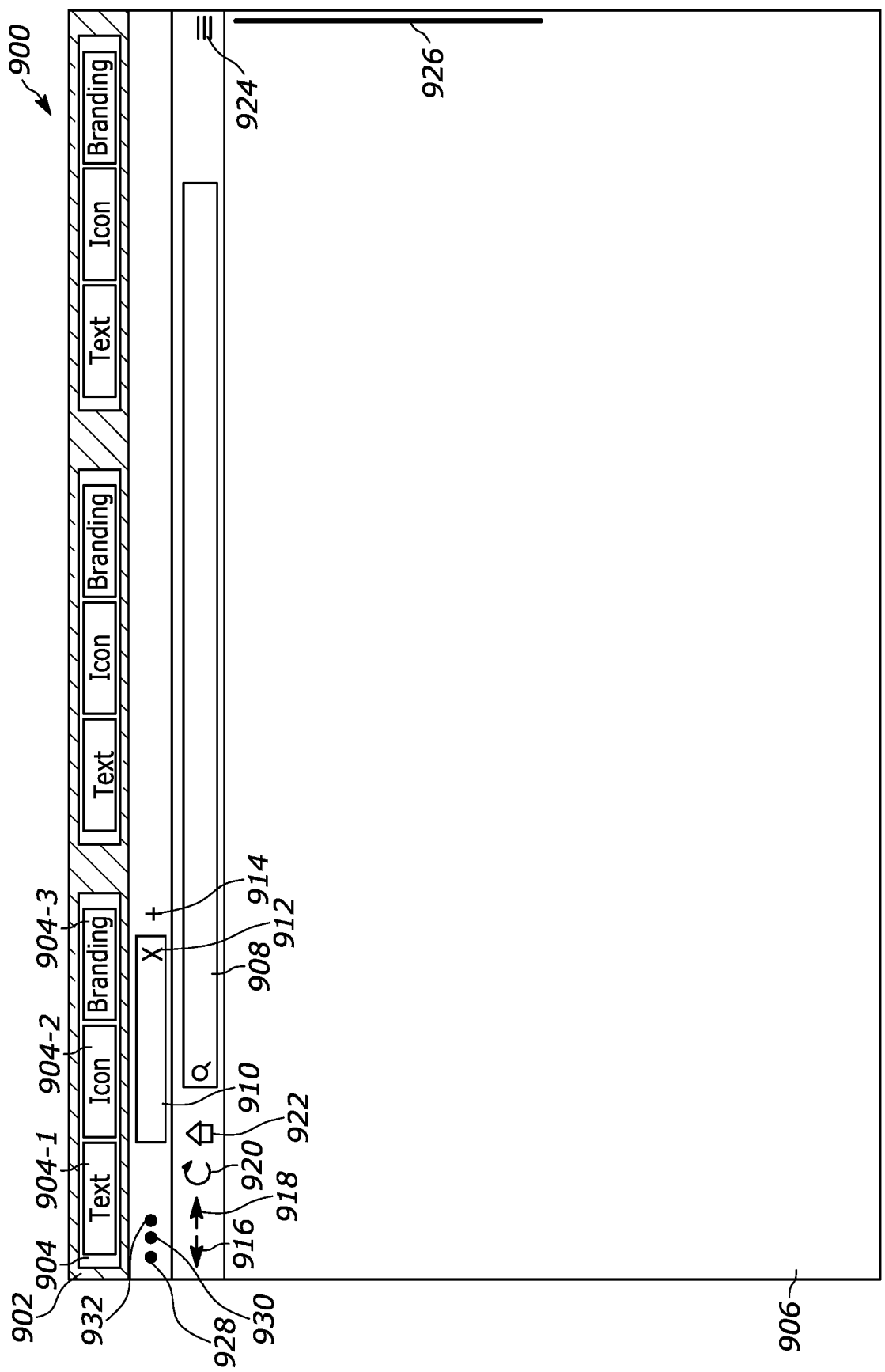
FIG. 9 depicts another example of an RBI protected browser, a border, and a security feature within the border.

FIG. 9 depicts another example of an RBI protected browser 900, a border 902, and a security feature 904 within the border 902. The RBI protected browser 900 includes the display window 906, the address bar 908, the title bar 910, the close tab button 912, the new tab button 914, the back button 916, the forward button 918, the refresh button 920, the homepage button 922, the menu button 924, the scroll bar 926, the close browser button 928, the minimize browser button 930, and the maximize browser button 932, the border 902 that includes the inner border and the outer border, and the security feature 904 that is repeated along the border 902 as described with reference to FIG. 7.

In contrast to FIG. 7, the security feature 904 within the border 902 shown in FIG. 9 includes security feature border 902-1, an icon 904-2, and branding 904-3, such that the security feature 904-1, the icon 904-2, and the branding 904-3 are repeated in a repeating pattern along the border 902. The security feature 904-1 may indicate RBI protected browsing, such that the security text may indicate a security profile and/or a security policy that a user is subject to during the RBI protected browsing.

Examples of the security feature 904-1 include, but are not limited to, "remote browser protection", "read only", "preview downloads", "allow downloads", "block uploads", "full interaction", or a combination thereof. Examples of the icon 904-2 include, but are not limited to, a shield, a lock, a checkmark, a security indicating icon, or a combination thereof. Examples of the branding 904-3 include, but are not limited to, a company logo, a company marker, or another company indicator. In some embodiments, the security feature 904-1, the icon 904-2, and the branding 904-3 may be transparent, translucent, and/or opaque.

Although not shown, in some embodiments, the security feature 904 includes a combination of the security feature 904-1, the icon 904-2, and/or the branding 904-3. As an example, the security feature 904 may include the security feature 904-1 and the icon 904-2 without the branding 904-3, the icon 904-2 and the branding 904-3 without the security feature 904-1, the security feature 904-1 and the branding 904-3 without the icon 904-2, etc. As another example, the security feature 904 includes varying numbers of the security feature 904-1, the icon 904-2, and/or the branding 904-3, such that the security feature 904 may include two icons, one security text, and zero branding, two brandings, one security text, and one icon, etc. Additionally, although the security feature 904 is shown as including the security feature 904-1, the icon 904-2, and the branding 904-3 in a particular order, the security feature 904-1, the icon 904-2, and the branding 904-3 are not limited to the particular order shown in FIG. 9.

Figure 10:
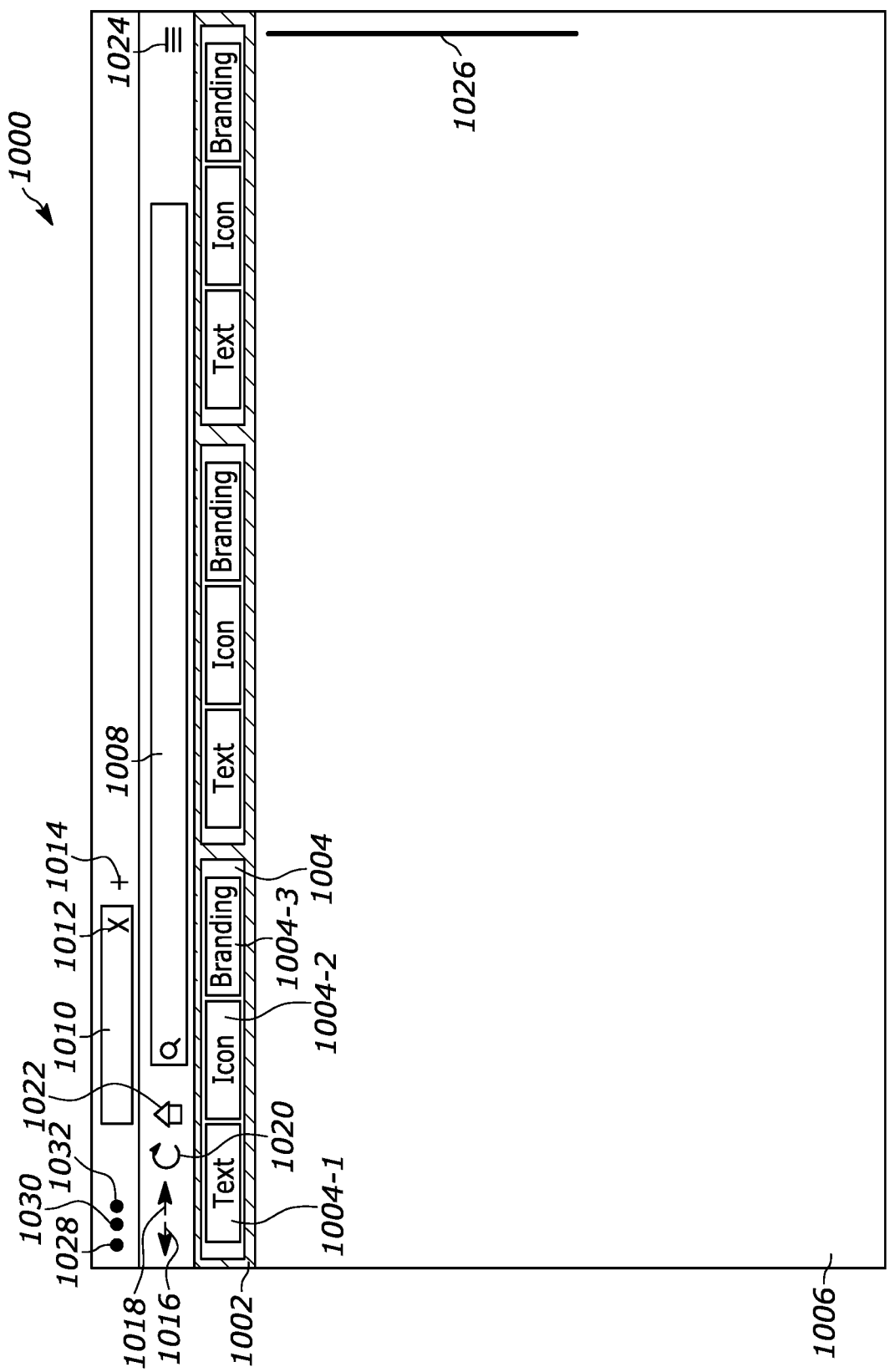
FIG. 10 depicts another example of an RBI protected browser, a border, and a security feature within the border.

FIG. 10 depicts another example of an RBI protected browser 1000, a border 1002, and a security feature 1004 within the border 1002. The RBI protected browser 1000 includes the display window 1006, the address bar 1008, the title bar 1010, the close tab button 1012, the new tab button 1014, the back button 1016, the forward button 1018, the refresh button 1020, the homepage button 1022, the menu button 1024, the scroll bar 1026, the close browser button 1028, the minimize browser button 1030, and the maximize browser button 1032, the border 1002 that includes the inner border and the outer border, and the security feature 1004 that includes the security feature 1004-1, the icon 1004-2, and the branding 1004-3 and that is repeated within the border 1002 as described with reference to FIG. 9.

In contrast to FIG. 9, the border 1002 shown in FIG. 10 is displayed partially around the display window 1006 of the RBI protected browser 1000 similarly as described with reference to FIG. 8.

Figure 11:
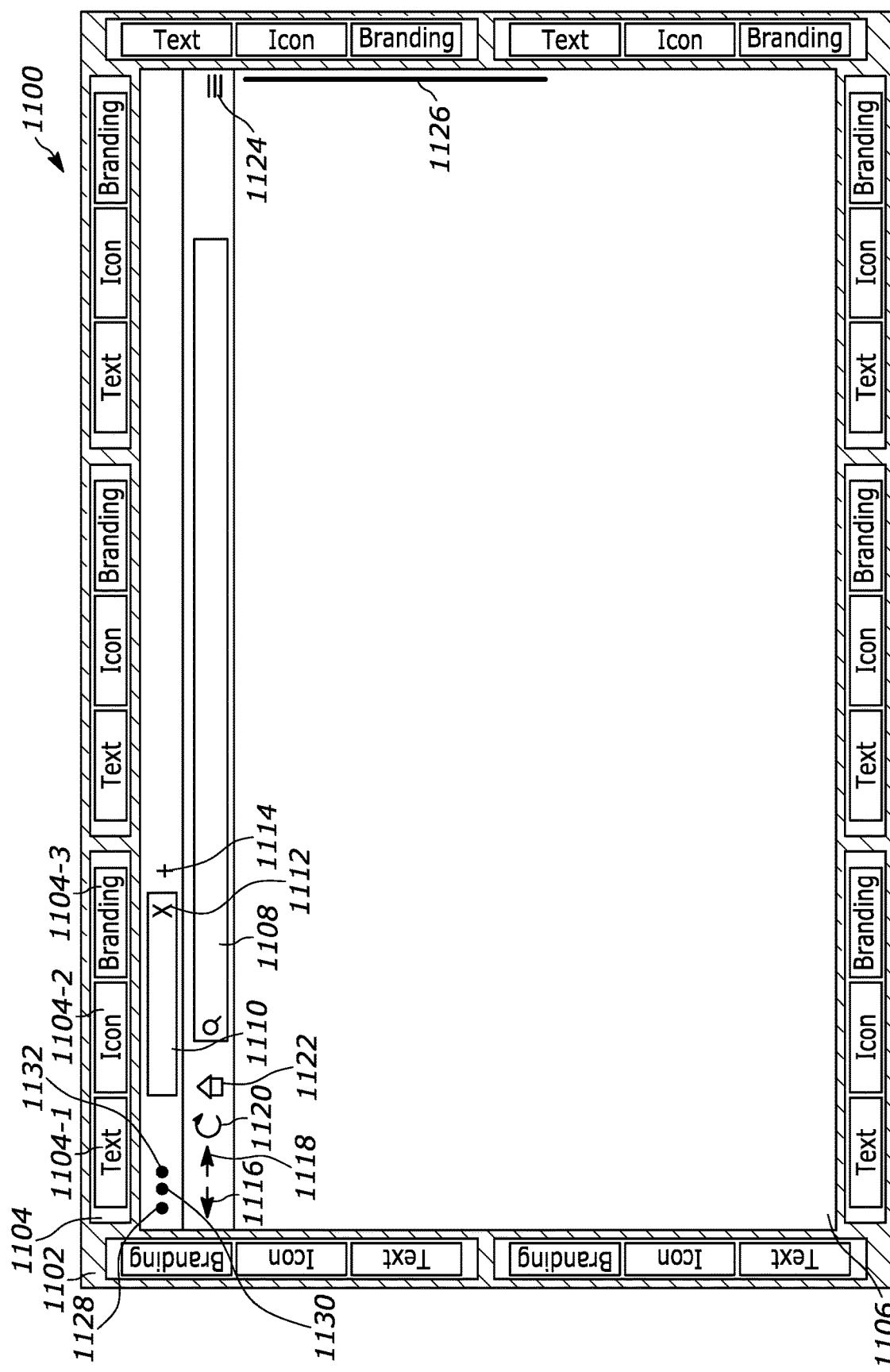
FIG. 11 depicts another example of an RBI protected browser, a border, and a security feature within the border.

FIG. 11 depicts another example of an RBI protected browser 1100, a border 1102, and a security feature 1104 within the border 1102. The RBI protected browser 1100 includes the display window 1106, the address bar 1108, the title bar 1110, the close tab button 1112, the new tab button 1114, the back button 1116, the forward button 1118, the refresh button 1120, the homepage button 1122, the menu button 1124, the scroll bar 1126, the close browser button 1128, the minimize browser button 1130, and the maximize browser button 1132, the border 1102 that includes the inner border and the outer border, and the security feature 1104 that is repeated along the border 1102 as described with reference to FIG. 5.

In contrast to FIG. 5, the security feature 1104 shown in FIG. 11 includes the security feature 1104-1, the icon 1104-2, and the branding 1104-3 similarly as described with reference to FIG. 9.

Figure 12:
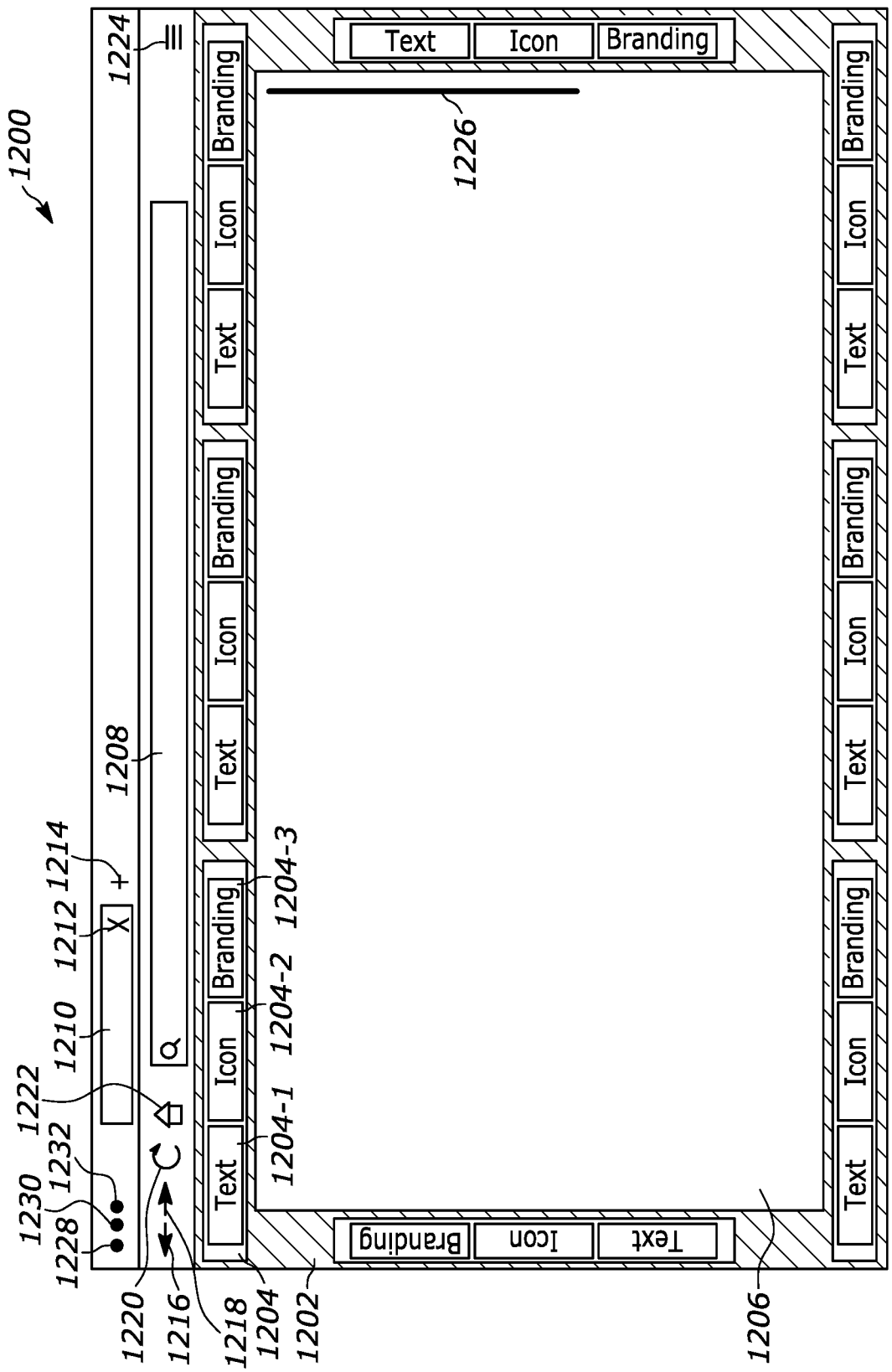
FIG. 12 depicts another example of an RBI protected browser, a border, and a security feature within the border.

FIG. 12 depicts another example of an RBI protected browser 1200, a border 1202, and a security feature 1204 within the border 1202. The RBI protected browser 1200 includes the display window 1206, the address bar 1208, the title bar 1210, the close tab button 1212, the new tab button 1214, the back button 1216, the forward button 1218, the refresh button 1220, the homepage button 1222, the menu button 1224, the scroll bar 1226, the close browser button 1228, the minimize browser button 1230, and the maximize browser button 1232, the border 1202 that includes the inner border and the outer border, and the security feature 1204 that is repeated along the border 1202 as described with reference to FIG. 6.

In contrast to FIG. 6, the security feature 1204 shown in FIG. 12 includes the security feature 1204-1, the icon 1204-2, and the branding 1204-3 similarly as described with reference to FIG. 9.

Figure 13:
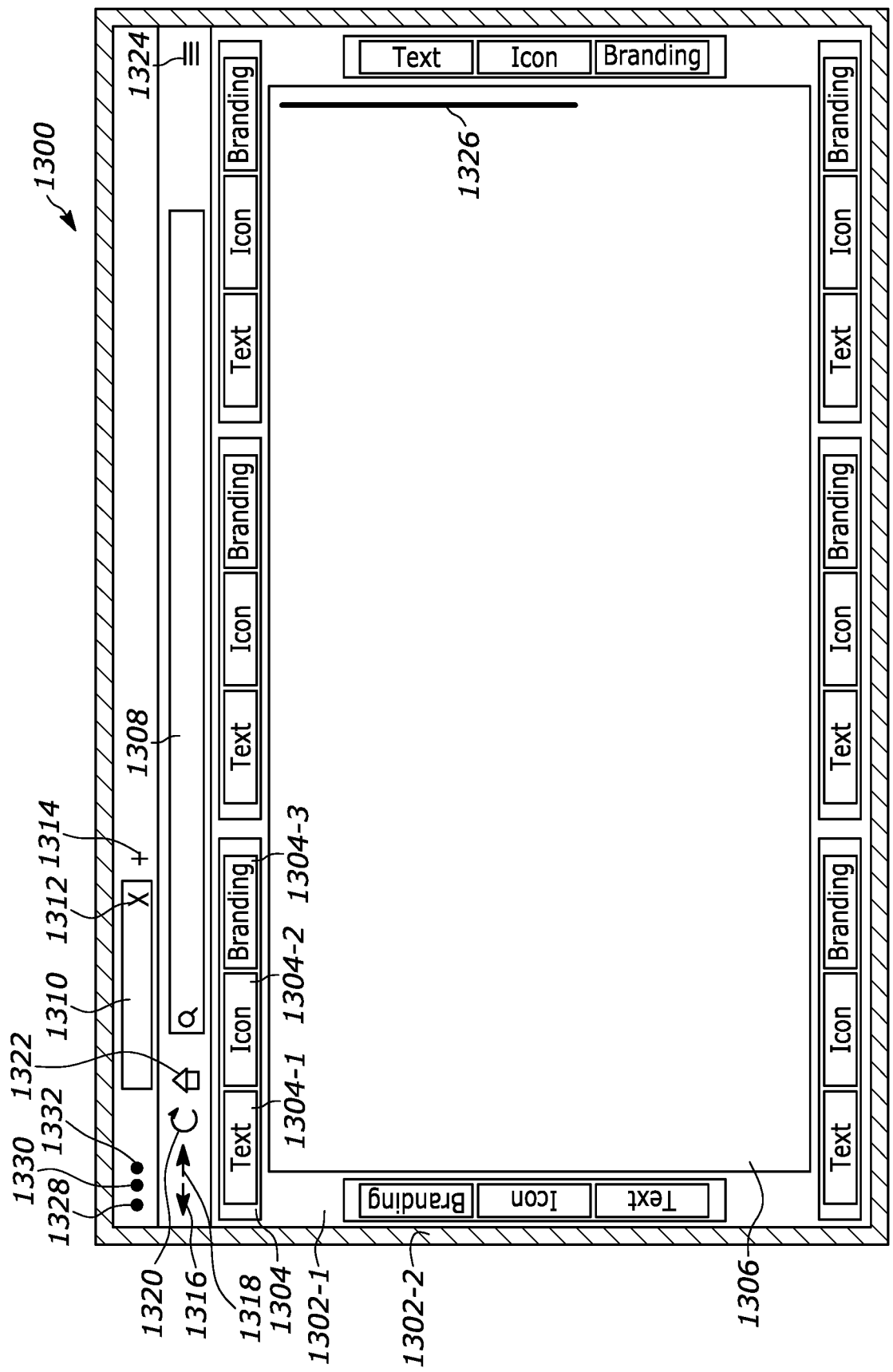
FIG. 13 depicts another example of an RBI protected browser, a border, and a security feature within the border.

FIG. 13 depicts another example of an RBI protected browser 1300, a border, and a security feature 1304 within the border. The RBI protected browser 1300 includes the display window 1306, the address bar 1308, the title bar 1310, the close tab button 1312, the new tab button 1314, the back button 1316, the forward button 1318, the refresh button 1320, the homepage button 1322, the menu button 1324, the scroll bar 1326, the close browser button 1328, the minimize browser button 1330, and the maximize browser button 1332, the border that includes an inner border 1302-1 and an outer border 1302-2, and the security feature 1304 that includes the security feature 1304-1, the icon 1304-2, and the branding 1304-3 and that is repeated within the border as described with reference to FIG. 12.

In contrast to FIG. 12, the inner border 1302-1 and the outer border 1302-2 shown in FIG. 13 are around the display window 1306 and the RBI protected browser 1300, respectively. The inner border 1302-1 is indicated by the security feature 1304 that includes the security feature 1304-1, the icon 1304-2, and the branding 1304-3 and the outer border 1302-2 is a colored border (shown by diagonal lines). In an embodiment, the inner border 1302-1 is directly adjacent to the outer edges of the display window 1306 and the outer border 1302-2 is directly adjacent to the outer edges of the RBI protected browser 1300. In such an embodiment, the inner border 1302-1 and the outer border 1302-2 are colinear along three edges (e.g., left edge, right edge, and bottom edge) of the RBI protected browser 1300.

Although not shown, in some embodiments, the inner border 1302-1 is also a colored border. Additionally, although the inner border 1302-1 is indicated by the security features and the outer border 1302-2 is a colored border, in some embodiments, the inner border is a colored border, and the outer border is indicated by the security features. In some embodiments, the outer border is partially around the RBI protected browser 1300 and the inner border is partially around the display window 1306 (similarly as described with reference to FIG. 7 and FIG. 8). In some embodiments, the outer border is around the RBI protected browser 1300 and the inner border is around (or partially around) the address bar 1308 and/or the title bar 1310.

In some embodiments, RBI protected browsing triggers RBI protected browsing actions. Examples of the RBI protected browsing actions include, but are not limited to, remote browser protection, read only, preview downloads, allow downloads, block uploads, full interaction, or a combination thereof. The RBI protected browsing action(s) may be indicated and/or displayed via a security feature of an RBI protected browser. For example, the RBI protected browsing action(s) indicated and/or displayed by security text and/or an icon included in the security feature.

In an embodiment, when a user of a client device triggers an RBI protected browsing action during RBI protected browsing, an indication of the RBI protected browsing action is displayed via a security feature of an RBI protected browser. For example, if uploads are blocked during RBI protected browsing, and the user attempts to upload content, then the "block uploads" RBI protected browsing action is indicated by the displayed security feature.

In another embodiment, when a user of a client device triggers an RBI protected browsing action during RBI protected browsing, the RBI protected browsing action is blocked, and the blocked RBI protected browsing action is indicated by the GUI of the client device. For example, if uploads are blocked during RBI protected browsing, and the user attempts to upload content, then the upload is blocked, and the blocked RBI protected browsing action is indicated by the GUI of the client device.

In some embodiments, a first security feature is displayed within the border as the security feature that indicates the RBI protected browsing, an RBI protected browsing action is triggered, where the RBI protected browsing action is triggered by the RBI protected browsing, and a second security feature is displayed within the border as the security feature that indicates the RBI protected browsing action. In such an embodiment, the security feature changes from the first security feature to the second security feature when the RBI protected browsing action is triggered.

In some embodiments, a first security feature is displayed within the border as the security feature that indicates the RBI protected browsing, a block uploads RBI protected browsing action is triggered, where the block uploads RBI protected browsing action is triggered by the RBI protected browsing, and a second security feature is displayed within the border as the security feature that indicates the block uploads RBI protected browsing action.

In some embodiments, a first security feature is displayed within the border as the security feature that indicates the RBI protected browsing, a read only RBI protected browsing action is triggered, where the read only RBI protected browsing action is triggered by the RBI protected browsing, and a second security feature is displayed within the border as the security feature that indicates the read only RBI protected browsing action.

In some embodiments, a first security feature is displayed within the border as the security feature that indicates the RBI protected browsing, a preview downloads RBI protected browsing action is triggered, where the preview downloads RBI protected browsing action is triggered by the RBI protected browsing, and a second security feature is displayed within the border as the security feature that indicates the preview downloads RBI protected browsing action.

In some embodiments, RBI protected browsing action(s) may be indicated by a dynamic security feature and/or a dynamic border. As described herein, a "dynamic security feature" may be a security feature that changes (e.g., from a first security feature to a second security feature, from a first iconographic visualization to a second iconographic visualization, from a first font typeface to a second font typeface, from a first font size to a second font size, etc.) when an RBI protected browsing action is triggered. As described herein, a "dynamic border" may be a border that changes (e.g., from a first color to a second color or from a first iconographic visualization to a second iconographic visualization) when an RBI protected browsing action is triggered. In some embodiments, after an RBI protected browsing action is triggered, different RBI protected browsing actions may be triggered by the RBI protected browsing. For example, a first set of RBI protected browsing actions are changed to a second set of RBI protected browsing actions, such that the RBI protected browsing is subject to different protection.

Examples of an RBI protected browser with a dynamic security feature are described in further detail with reference to FIG. 14A and FIG. 14B.

Figure 14A:
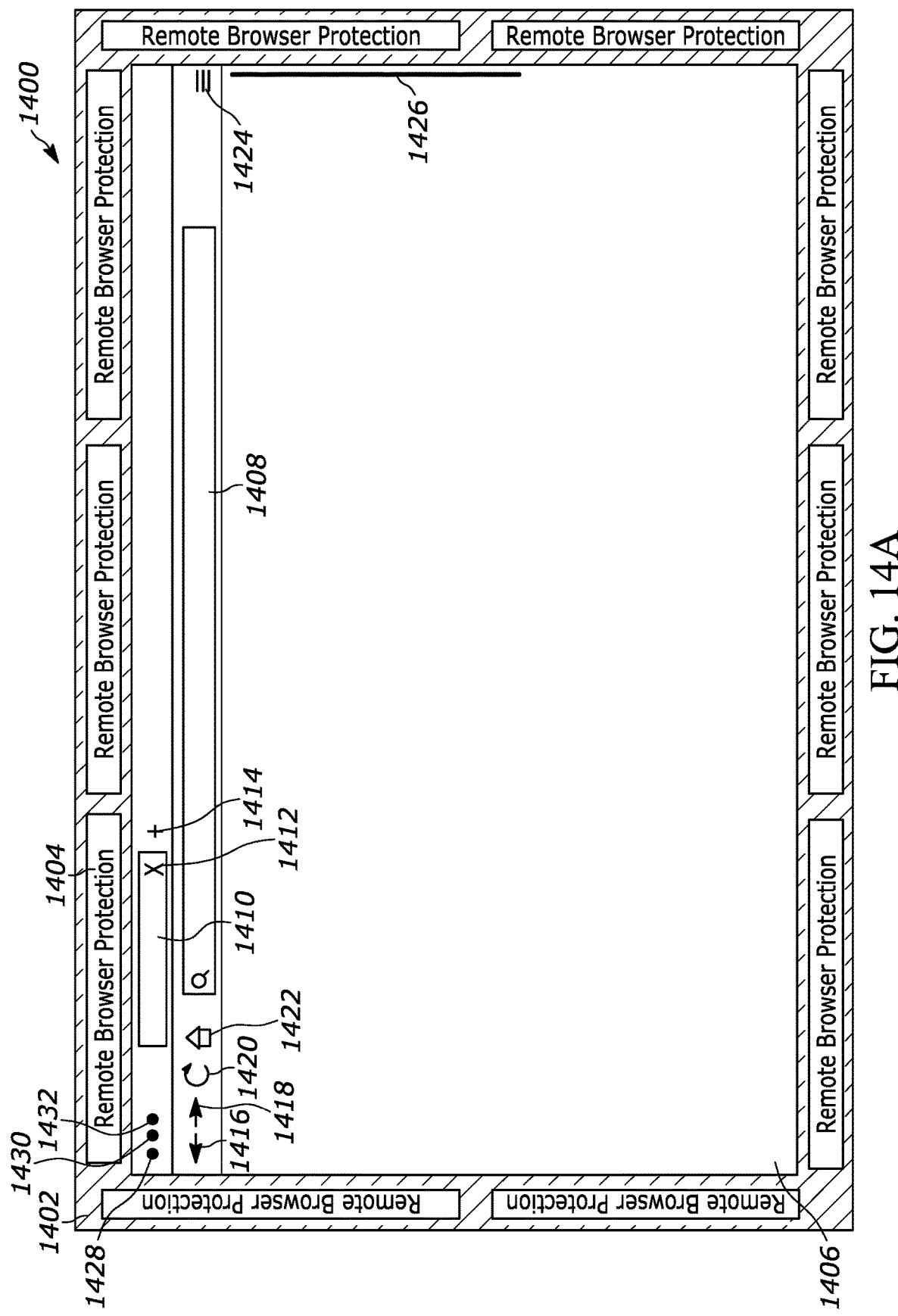
FIG. 14A depicts an example of an RBI protected browser before an RBI protected browsing action is triggered.

FIG. 14A depicts an example of an RBI protected browser 1400 before an RBI protected browsing action is triggered. The RBI protected browser 1400 includes the display window 1406, the address bar 1408, the title bar 1410, the close tab button 1412, the new tab button 1414, the back button 1416, the forward button 1418, the refresh button 1420, the homepage button 1422, the menu button 1424, the scroll bar 1426, the close browser button 1428, the minimize browser button 1430, and the maximize browser button 1432, the border 1402 that includes the inner border and the outer border, and the security feature 1404 that is repeated along the border 1402 as described with reference to FIG. 5.

In the embodiment of FIG. 14A, the security feature 1404 displays security text (shown by "Remote Browser Protection") within the border 1402 during RBI protected browsing. In such an embodiment, the security feature 1404 may be referred to as a first security feature and may indicate the RBI protected browsing. In an embodiment, RBI protected browsing actions (e.g., remote browser protection, read only, preview downloads, allow downloads, block uploads, full interaction, etc.) may be triggered by the RBI protected browsing and may protect a client device from performing the RBI protected browsing action(s). The RBI protected browsing actions may be triggered, for example, by a user. When one or more of the RBI protected browsing actions is triggered, the RBI protected browsing action may be blocked, indicated, and/or displayed. The RBI protected browser 1400 may indicate and/or display the RBI protected browsing action via the security feature 1404 and/or the border 1402.

Although not shown, the security feature 1404 may also include an icon, branding, or a combination thereof as described with reference to FIG. 11. In addition, the security feature 1404 may be implemented in the RBI protected browsers shown in FIGS. 6-13.

Figure 14B:
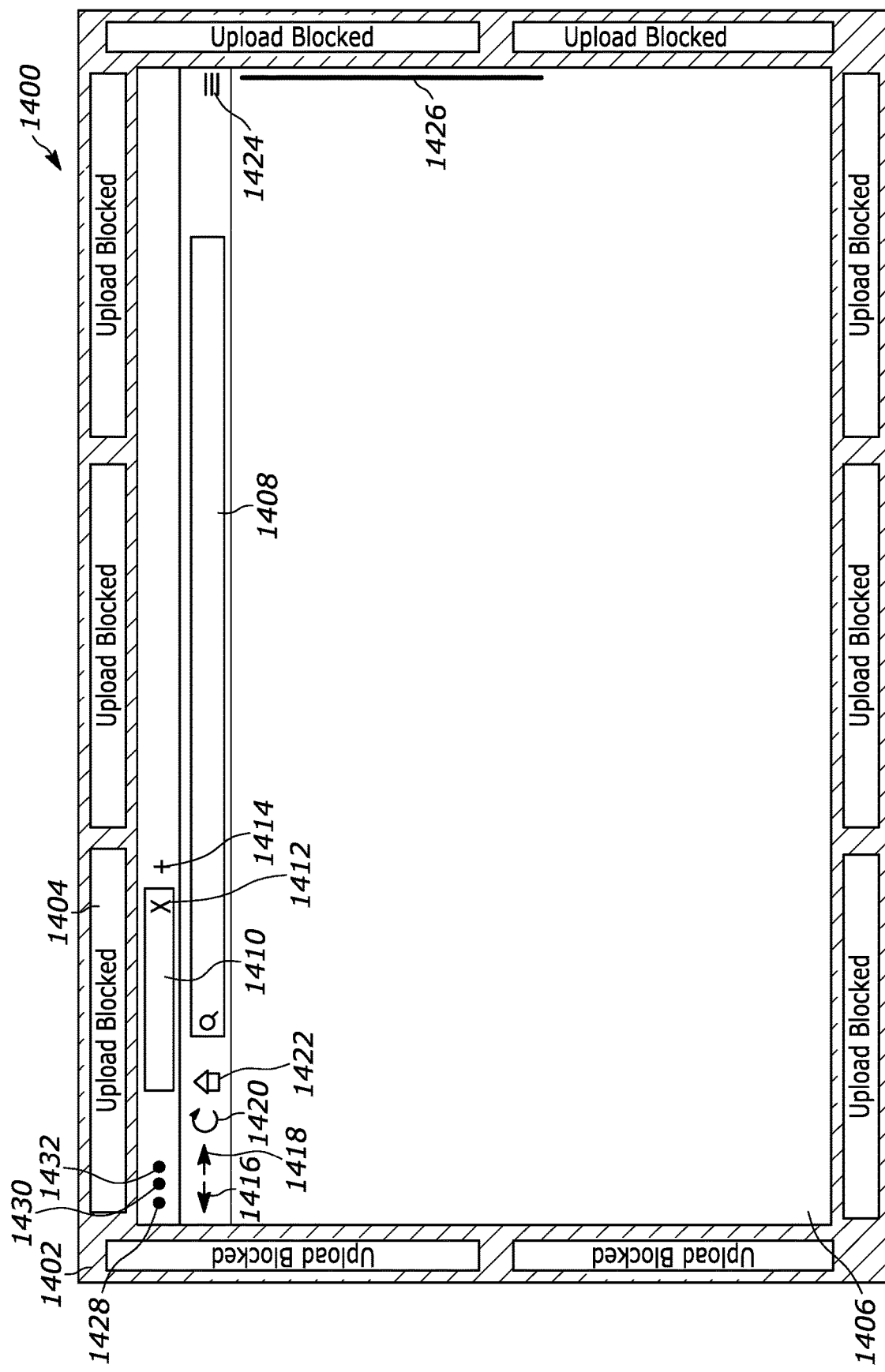
FIG. 14B depicts an example of the RBI protected browser after the RBI protected browsing action is triggered.

FIG. 14B depicts an example of the RBI protected browser 1400 after the RBI protected browsing action is triggered. The RBI protected browser 1400 includes the display window 1406, the address bar 1408, the title bar 1410, the close tab button 1412, the new tab button 1414, the back button 1416, the forward button 1418, the refresh button 1420, the homepage button 1422, the menu button 1424, the scroll bar 1426, the close browser button 1428, the minimize browser button 1430, and the maximize browser button 1432, the border 1402 that includes the inner border and the outer border, and the security feature 1404 that is repeated along the border 1402 as described with reference to FIG. 14A.

In contrast to FIG. 14A, the security feature 1404 shown in FIG. 14B displays changed security text (shown by "Upload Blocked") within the border 1402. In an embodiment, the security feature 1404 changes after the RBI protected browsing action in triggered. In such an embodiment, when the security feature 1404 (e.g., security text, branding, and/or icon) changes, the security feature 1404 may be referred to as a second security feature. By changing the first security feature to the second security feature when the RBI protected browsing action is triggered, the RBI protected browser displays an indication of the RBI protected browsing action to the user.

Although not shown, other examples of displaying the indication of the RBI protected browsing action via the border or the security feature may include changing a color of part (or all) of the border, flashing the color of the border, displaying a pop-up security feature message, changing a color of a hyperlink corresponding to the RBI protected browsing action, changing font size/color, etc. In addition, other examples of displaying the indication of the RBI protected browsing action may include sliding the security feature in/out of the border or RBI protected browser, or having the security feature appear/disappear from the border or the RBI protected browser.

Examples of the RBI protected browsers shown in FIGS. 11-13 are described in further detail with reference to FIGS. 15-19.

Figure 15:
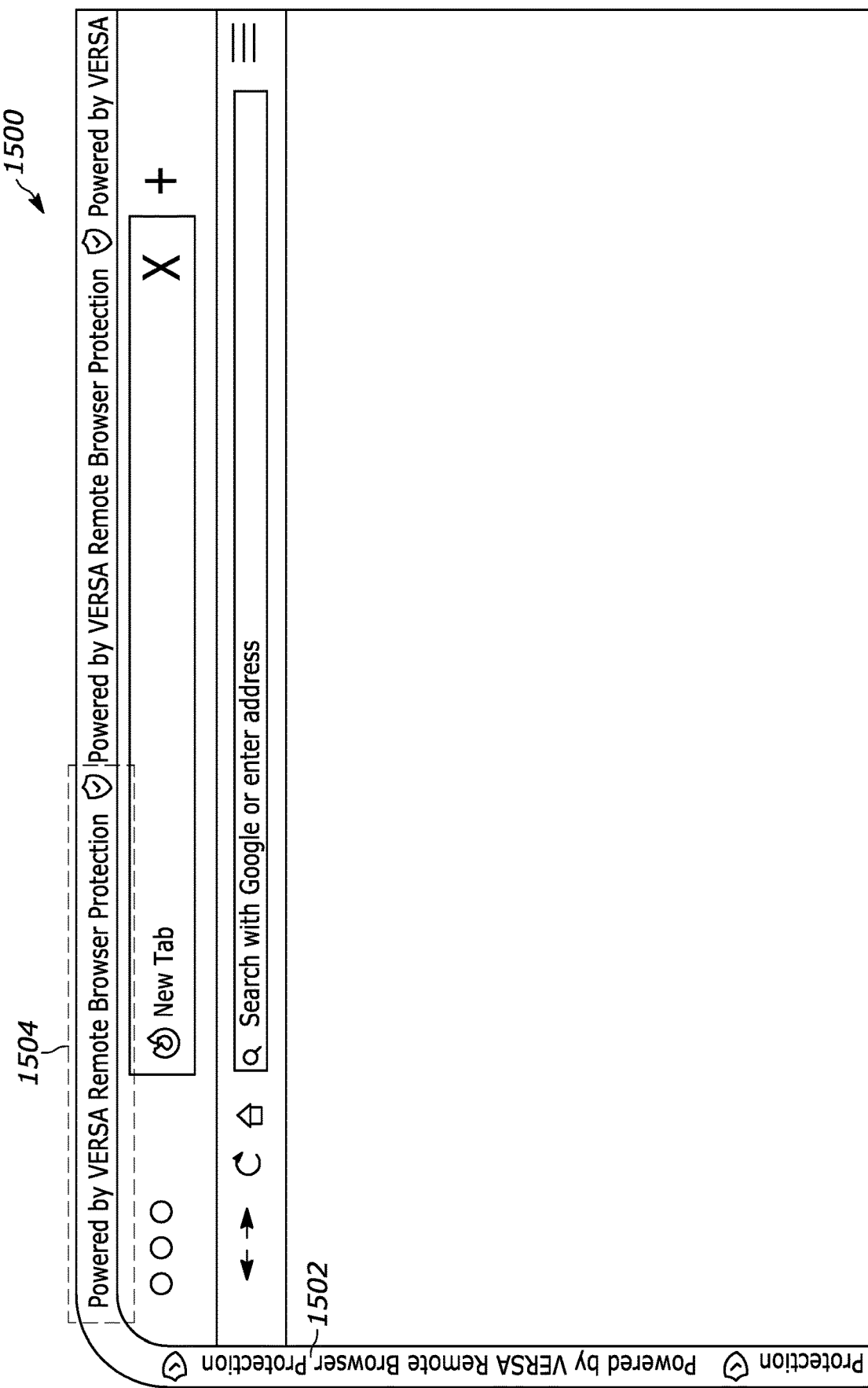
FIG. 15 depicts an example of the RBI protected browser shown in FIG. 11.

FIG. 15 depicts an example of the RBI protected browser 1500 shown in FIG. 11. In the embodiment depicted in FIG. 15, the RBI protected browser 1500 displays a border 1502 and a security feature 1504 that is displayed using a repeating pattern along the border 1502. The security feature 1504 includes branding (shown by "Protected by Versa Networks"), security text (shown by "Remote Browser Protection"), and an icon (shown by a shield with a checkmark).

Figure 16:
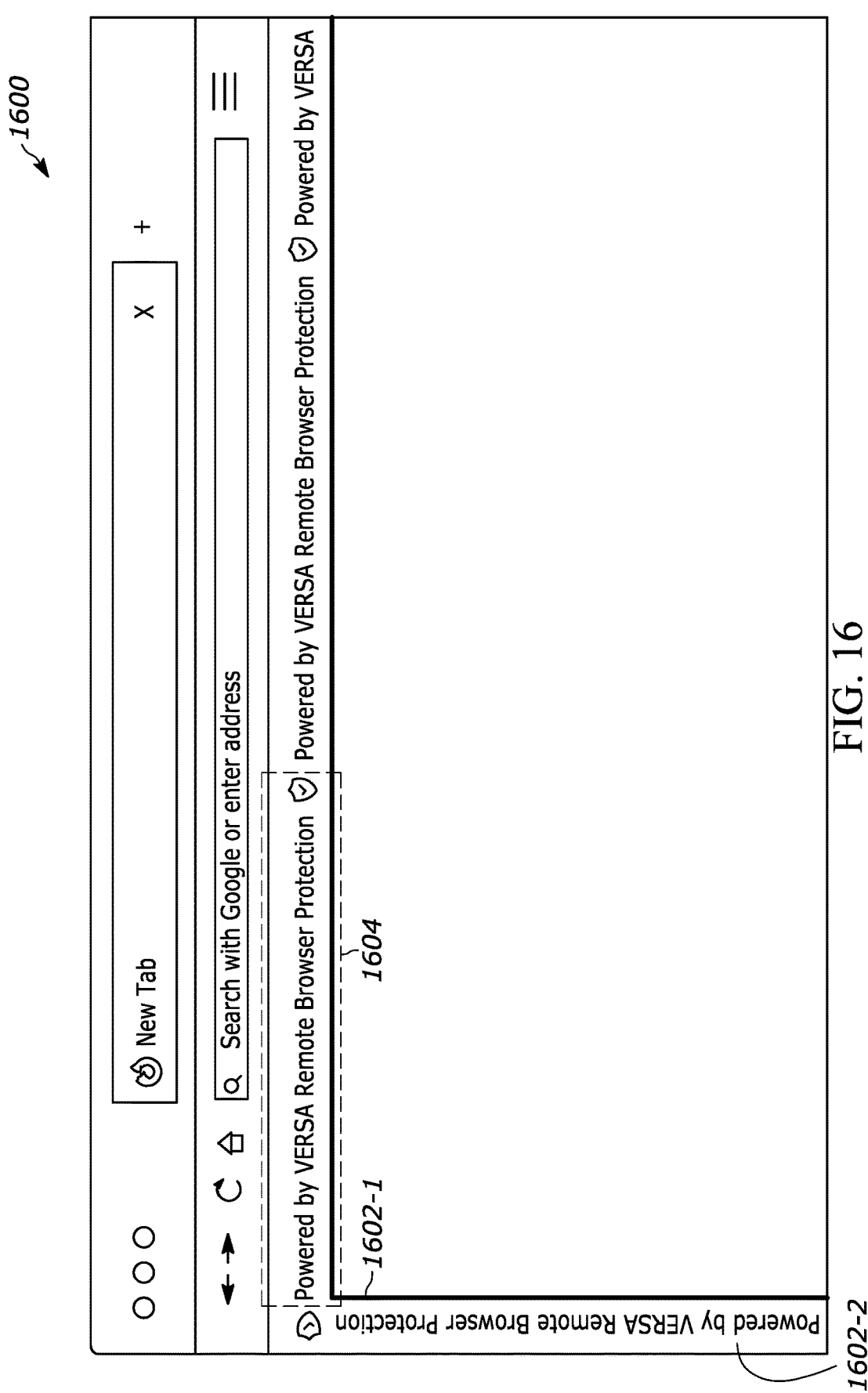
FIG. 16 depicts an example of the RBI protected browser shown in FIG. 12.

FIG. 16 depicts an example of the RBI protected browser 1600 shown in FIG. 12. In the embodiment depicted in FIG. 16, the RBI protected browser 1600 displays a border and a security feature 1604. The border includes an inner border 1602-1 that is a colored border and that is around a display window of the RBI protected browser 1600, and an outer border 1602-2 that is indicated by the security feature 1604 that is repeated in a repeating pattern and that is around the inner border 1602-1. The security feature 1604 includes branding (shown by "Protected by Versa Networks"), security text (shown by "Remote Browser Protection"), and an icon (shown by a shield with a checkmark).

Figure 17:
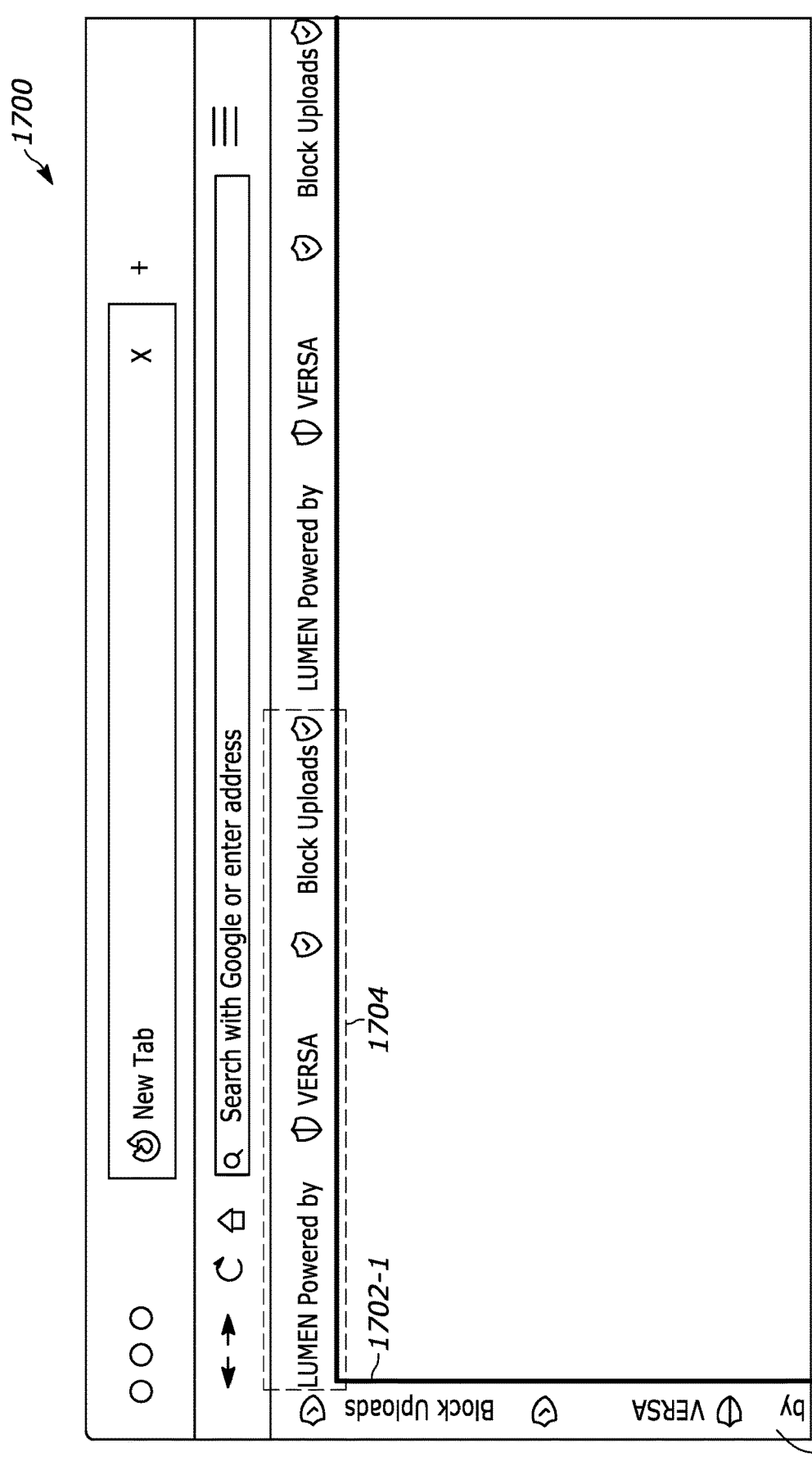
FIG. 17 depicts another example of the RBI protected browser shown in FIG. 12.

FIG. 17 depicts another example of the RBI protected browser 1700 shown in FIG. 12. In the embodiment of FIG. 17, the RBI protected browser 1700 displays the border that includes the inner border 1702-1 and the outer border 1702-2, and the security feature 1704 that is repeated in the repeating pattern as described with reference to FIG. 16. The security feature 1704 includes branding (shown by "Lumen Powered by Versa"), security text (shown by "Block Uploads"), and icons (shown by shields with checkmarks). In an embodiment, the branding shown by "Lumen Powered by Versa" is partner co-branding.

Figure 18:
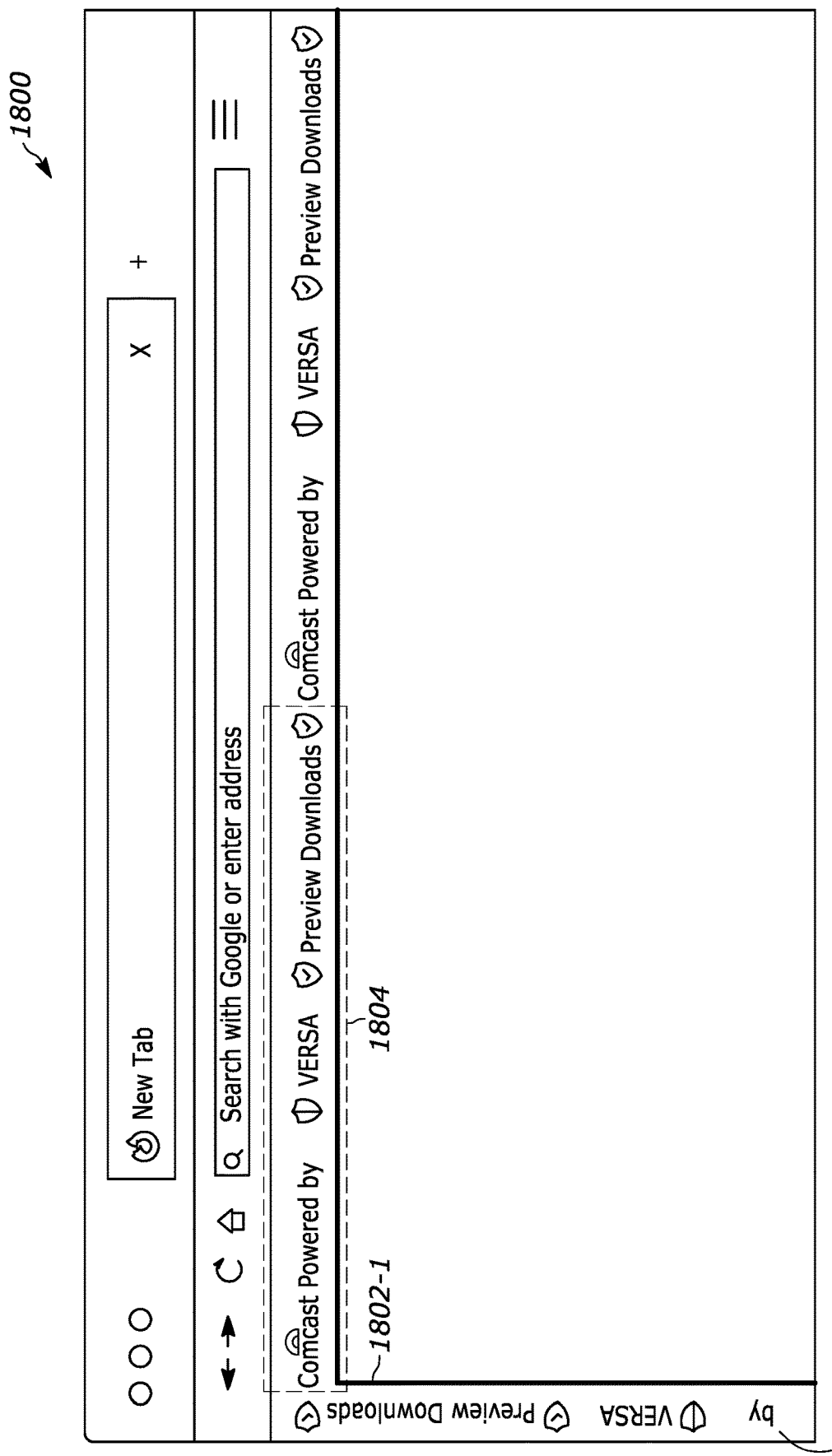
FIG. 18 depicts another example of the RBI protected browser shown in FIG. 12.

FIG. 18 depicts another example of the RBI protected browser 1800 shown in FIG. 12. In the embodiment of FIG. 18, the RBI protected browser 1800 displays the border that includes the inner border 1802-1 and the outer border 1802-2, and the security feature 1804 that is repeated in the repeating pattern as described with reference to FIG. 16. The security feature 1804 includes branding (shown by "Comcast Powered by Versa"), security text (shown by "Preview Downloads"), and icons (shown by shields with checkmarks). In an embodiment, the branding shown by "Comcast Powered by Versa" is partner co-branding.

Figure 19:
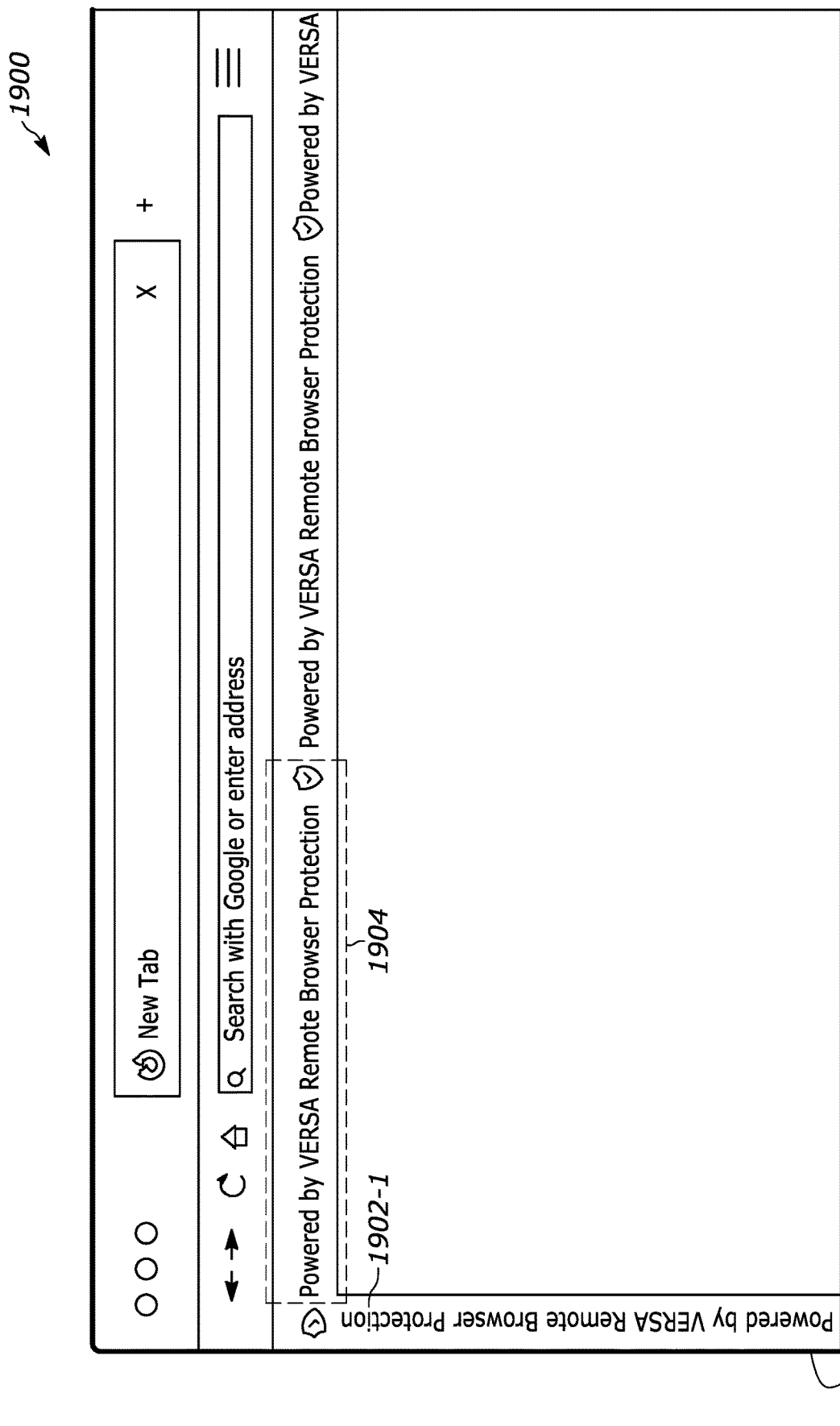
FIG. 19 depicts an example of the RBI protected browser shown in FIG. 13.

FIG. 19 depicts an example of the RBI protected browser 1900 shown in FIG. 13. In the embodiment depicted in FIG. 19, the RBI protected browser 1900 includes a border and a security feature 1904 that is displayed using a repeating pattern. The border includes an inner border 1902-1 that is indicated by the security feature 1904 and that is around a display window of the RBI protected browser 1900, and an outer border 1902-2 that is a colored border and that is around the RBI protected browser 1900. The security feature 1904 includes branding (shown by "Protected by Versa Networks"), security text (shown by "Remote Browser Protection"), and an icon (shown by a shield with a checkmark).

In some embodiments, the examples shown in FIGS. 15-19 are example images that may be displayed via a display screen of an electronic device (e.g., the display 308 of the client device 302 shown in FIG. 3).

Figure 20:
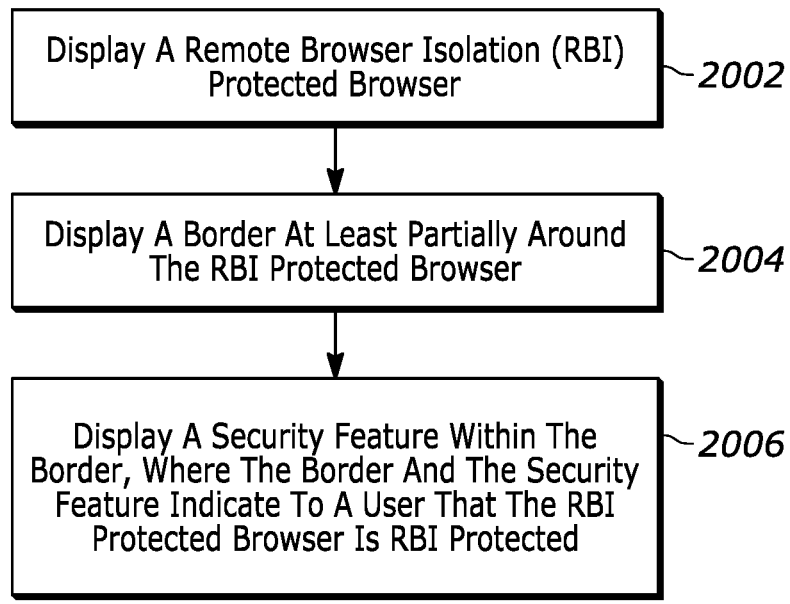
FIG. 20 illustrates a flow diagram of a technique for displaying an RBI protected browser in accordance with an embodiment of the invention.

FIG. 20 illustrates a flow diagram of a technique for displaying an RBI protected browser in accordance with an embodiment of the invention. At block 2002, an RBI protected browser is displayed. At block 2004, a border that is at least partially around the RBI protected browser is displayed. At block 2006, a security feature within the border is displayed, where the border and the security feature indicate to a user that the RBI protected browser is RBI protected.

Figure 21:
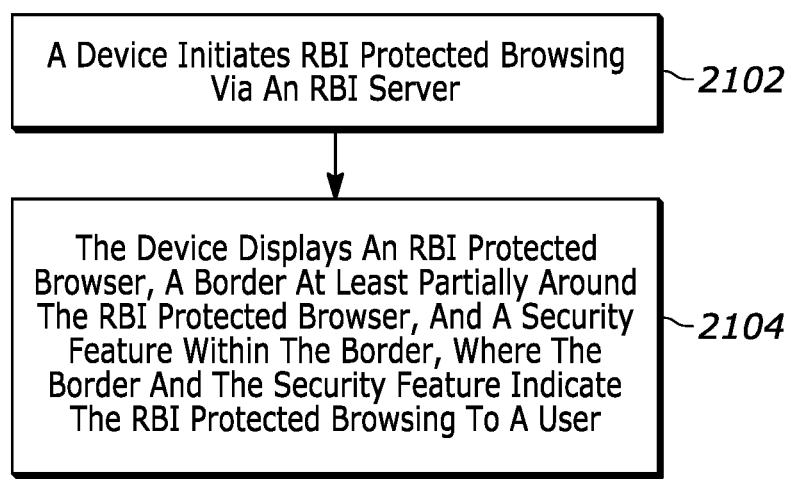
FIG. 21 illustrates a flow diagram of another technique for displaying an RBI protected browser in accordance with an embodiment of the invention.

FIG. 21 illustrates a flow diagram of another technique for displaying an RBI protected browser in accordance with an embodiment of the invention. At block 2102, a device initiate RBI protected browsing via an RBI server. At block 2104, the device displays an RBI protected browser, a border at least partially around the RBI protected browser, and a security feature within the border, where the border and the security feature indicate the RBI protected browsing to a user.

In some embodiments, the technique for displaying an RBI protected browser includes a non-transitory computer readable medium including instructions to be executed in a computer system. For example, the instructions when executed in the computer system perform a technique that includes displaying an RBI protected browser, displaying a border at least partially around the RBI protected browser, and displaying a security feature within the border, where the border and the security feature indicate to a user that the RBI protected browser is RBI protected.

In some embodiments, the technique for displaying an RBI protected browser includes a non-transitory computer readable medium including instructions to be executed in a computer system. For example, the instructions when executed in the computer system perform a technique that includes displaying an RBI protected browser, displaying a border around the RBI protected browser, and displaying a security feature within the border, where the border and the security feature indicate to a user that the RBI protected browser is RBI protected.

In some embodiments, the technique for displaying an RBI protected browser includes a non-transitory computer readable medium including instructions to be executed in a computer system. For example, the instructions when executed in the computer system perform a technique that includes displaying an RBI protected browser, displaying a watermark at least partially around the RBI protected browser, and displaying a security feature within the watermark, where the watermark and the security feature indicate to a user that the RBI protected browser is RBI protected.

In some embodiments, the technique for displaying an RBI protected browser involves initiating, by a device, RBI protected browsing via an RBI server, and displaying, by the device, an RBI protected browser, a border at least partially around the RBI protected browser, and a security feature within the border, where the border and the security feature indicate the RBI protected browsing to a user.

In some embodiments, the technique for displaying an RBI protected browser includes a non-transitory computer readable medium including instructions to be executed in a computer system. For example, the instructions when executed in the computer system perform a technique that includes initiating RBI protected browsing via an RBI server, and displaying an RBI protected browser, a border at least partially around the RBI protected browser, and a security feature within the border, where the border and the security feature indicate the RBI protected browsing to a user.

In some embodiments, the technique for displaying an RBI protected browser includes a non-transitory computer readable medium including instructions to be executed in a computer system. For example, the instructions when executed in the computer system perform a technique that includes initiating RBI protected browsing via an RBI server, and displaying an RBI protected browser, a watermark at least partially around the RBI protected browser, and a security feature within the watermark, where the watermark and the security feature indicate the RBI protected browsing to a user.

It is understood that the scope of the protection for systems and methods disclosed herein is extended to such a program and in addition to a computer readable means having a message therein, such computer readable storage means contain program code means for implementation of one or more steps of the method, when the program runs on a server or mobile device or any suitable programmable device.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware, or a combination thereof. The above-described embodiments of the invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine-readable instructions executable by a digital data processor to perform the method in accordance with an embodiment of the present invention.

The computer readable media may comprise, for example, random access memory (not shown) contained within the computer. Alternatively, the instructions may be contained in another computer readable media such as a magnetic data storage diskette and directly or indirectly accessed by a computer system. Whether contained in the computer system or elsewhere, the instructions may be stored on a variety of machine-readable storage media, such as a direct access storage device (DASD) storage (e.g., a conventional "hard drive" or a Redundant Array of Independent Drives (RAID) array), magnetic tape, electronic read-only memory, an optical storage device (e.g., CD ROM, WORM, DVD, digital optical tape), paper "punch" cards. In an illustrative embodiment of the invention, the machine-readable instructions may comprise lines of compiled C, C++, or similar language code commonly used by those skilled in the programming for this type of application arts.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A non-transitory computer readable medium comprising instructions to be executed in a computer system, wherein the instructions when executed in the computer system perform a method comprising:
   displaying a remote browser isolation (RBI) protected browser;
   displaying a border at least partially around the RBI protected browser; and
   displaying a security feature within the border;
   wherein the border and the security feature indicate to a user that the RBI protected browser is RBI protected;
   wherein the border includes an outer border edge and an inner border edge, and wherein the inner border edge is directly adjacent to at least one edge of the RBI protected browser;
   wherein the border is colored between the outer border edge and the inner border edge and the security feature is at least one of security text and an icon;
   wherein the security feature is repeated multiple times between the inner border edge and the outer border edge; and
   wherein the repeated security features are separated from the inner border edge and from the outer border edge by a distance that is at least humanly visible.

2. The non-transitory computer readable medium of claim 1, wherein the security feature is displayed using a repeating pattern along the border.

3. The non-transitory computer readable medium of claim 2, wherein the security feature is an icon.

4. The non-transitory computer readable medium of claim 2, wherein the security feature is security text.

5. The non-transitory computer readable medium of claim 4, wherein the security text is at least one of remote browser protection, read only, preview downloads, allow downloads, block uploads, and full interaction.

6. The non-transitory computer readable medium of claim 1, wherein the security feature indicates RBI protected browsing.

7. The non-transitory computer readable medium of claim 1, wherein the border is directly adjacent to at least one edge of the RBI protected browser.

8. The non-transitory computer readable medium of claim 1, wherein the border is displayed at least partially around an address bar of the RBI protected browser.

9. The non-transitory computer readable medium of claim 1, wherein the border is displayed at least partially around a title bar of the RBI protected browser.

10. The non-transitory computer readable medium of claim 1, wherein the border is displayed at least partially around an edge of a display window of the RBI protected browser.

11. The non-transitory computer readable medium of claim 1, wherein the border includes an outer border and an inner border, and wherein the inner border is directly adjacent to the outer border along at least one edge.

12. The non-transitory computer readable medium of claim 11, wherein:
the inner border is directly adjacent to an outer edge of the RBI protected browser; and
the inner border and the outer edge of the RBI protected browser are colinear.

13. The non-transitory computer readable medium of claim 11, wherein:
the outer border is displayed at least partially around an edge of the RBI protected browser; and
the inner border is displayed at least partially around an edge of a display window of the RBI protected browser.

14. The non-transitory computer readable medium of claim 11, wherein:
the outer border is a colored border; and
the inner border is indicated by the security feature, wherein the security feature is displayed using a repeating pattern along the inner border.

15. The non-transitory computer readable medium of claim 11, wherein:
the outer border is indicated by the security feature, wherein the security feature is displayed using a repeating pattern along the outer border; and
the inner border is a colored border.

16. The non-transitory computer readable medium of claim 1, wherein the security feature includes a first security feature and a second security feature, and wherein the first security feature changes to the second security feature when an RBI protected browsing action is triggered.

17. The non-transitory computer readable medium of claim 1, wherein the security feature is at least one of security text, an icon, and branding.

18. The non-transitory computer readable medium of claim 17, wherein:
the colored border is green;
the security text indicates at least one of a security profile and a security policy that a user is subject to during RBI protected browsing;
the icon is a shield;
the branding is a company logo.

19. A non-transitory computer readable medium comprising instructions to be executed in a computer system, wherein the instructions when executed in the computer system perform a method comprising:
displaying a remote browser isolation (RBI) protected browser;
displaying a border around the RBI protected browser; and
displaying a security feature within the border;
wherein the border and the security feature indicate to a user that the RBI protected browser is RBI protected;
wherein the border includes an outer border edge and an inner border edge, and wherein the inner border edge is directly adjacent to at least one edge of the RBI protected browser;
wherein the border is colored between the outer border edge and the inner border edge and the security feature is at least one of security text and an icon;
wherein the security feature is repeated multiple times between the inner border edge and the outer border edge; and
wherein the repeated security features are separated from the inner border edge and from the outer border edge by a distance that is at least humanly visible.

* * * * *